(12) United States Patent
Titcombe et al.

(10) Patent No.: US 9,055,506 B2
(45) Date of Patent: Jun. 9, 2015

(54) NETWORK ARCHITECTURE

(75) Inventors: Steven Titcombe, Newbury (GB); Jeff Hiltz, Newbury (GB)

(73) Assignee: VODAFONE IP LICENSING LIMITED, Newbury, Berkshire (GB)

( * ) Notice: Subject to any disclaimer, the term of this patent is extended or adjusted under 35 U.S.C. 154(b) by 428 days.

(21) Appl. No.: 13/437,646

(22) Filed: Apr. 2, 2012

(65) Prior Publication Data

US 2013/0089025 A1    Apr. 11, 2013

(30) Foreign Application Priority Data

Apr. 1, 2011    (GB) .................................. 1105565.4

(51) Int. Cl.
| | |
|---|---|
| H04W 4/00 | (2009.01) |
| H04W 40/00 | (2009.01) |
| H04W 8/08 | (2009.01) |
| H04Q 3/00 | (2006.01) |
| H04L 29/06 | (2006.01) |

(52) U.S. Cl.
CPC ............... *H04W 40/00* (2013.01); *H04W 8/08* (2013.01); *H04Q 3/0045* (2013.01); *H04L 65/1006* (2013.01); *H04L 65/1016* (2013.01); *H04L 65/1046* (2013.01); *H04L 65/1069* (2013.01); *H04L 65/80* (2013.01)

(58) Field of Classification Search
None
See application file for complete search history.

(56) References Cited

U.S. PATENT DOCUMENTS

| | | | | |
|---|---|---|---|---|
| 6,661,879 B1 * | 12/2003 | Schwartz et al. | .......... | 379/88.25 |
| 6,671,523 B1 * | 12/2003 | Niepel et al. | .................. | 455/558 |
| 7,369,848 B2 * | 5/2008 | Jiang | .......................... | 455/432.3 |
| 7,460,861 B2 * | 12/2008 | Zabawskyj | ..................... | 455/416 |
| 7,505,769 B2 * | 3/2009 | Jiang | .......................... | 455/432.3 |
| 7,577,431 B2 * | 8/2009 | Jiang | .......................... | 455/432.1 |
| 7,912,464 B2 * | 3/2011 | Jiang | .......................... | 455/432.1 |
| 7,920,529 B1 * | 4/2011 | Mahler et al. | ................. | 370/338 |
| 8,036,210 B2 * | 10/2011 | Zhu et al. | ...................... | 370/352 |
| 8,238,905 B2 * | 8/2012 | Jiang | .......................... | 455/432.1 |

(Continued)

FOREIGN PATENT DOCUMENTS

| | | |
|---|---|---|
| GB | 2395092 | 5/2004 |
| WO | WO2006/065190 | 6/2006 |

(Continued)

OTHER PUBLICATIONS

GB Search Report dated Aug. 3, 2012 as issued in corresponding GB application GB1205907.7 filed May 7, 1669.

(Continued)

*Primary Examiner* — Gregory Sefcheck
(74) *Attorney, Agent, or Firm* — Workman Nydegger

(57) ABSTRACT

A telecommunications system is provided comprising a mobile device and an IP Multi-media Sub-system (IMS), the mobile device being connected to a Public Land Mobile Network, PLMN. The mobile device is adapted to: identify if the PLMN supports Customized Applications for Mobile network Enhanced Logic, CAMEL; and, upon receiving an attempt to initiate a call to a dialled number, if the PLMN supports CAMEL, allow the call to proceed. The PLMN is adapted to: receive a request to connect a call from the mobile device; invoke a CAMEL service trigger indicating that the call should be routed to the IMS; and, route the call to the IMS. The IMS is adapted to: control the call; and, refer the call to a call storage system for call storage. A mobile device, IP Multi-media Sub-system and method in a mobile device are also provided.

23 Claims, 14 Drawing Sheets

(56) References Cited

U.S. PATENT DOCUMENTS

| | | | |
|---|---|---|---|
| 8,271,039 B2* | 9/2012 | Capuozzo et al. | 455/560 |
| 8,416,934 B2* | 4/2013 | Poepperl | 379/201.01 |
| 8,463,297 B2* | 6/2013 | Bull et al. | 455/456.4 |
| 8,498,634 B2* | 7/2013 | Kahn et al. | 455/422.1 |
| 8,509,805 B2* | 8/2013 | Anderson et al. | 455/456.1 |
| 8,521,170 B2* | 8/2013 | Buckley et al. | 455/445 |
| 2004/0043792 A1 | 3/2004 | Simmons | |
| 2004/0048629 A1 | 3/2004 | Yoon et al. | |
| 2006/0009214 A1 | 1/2006 | Cardina et al. | |
| 2006/0252425 A1* | 11/2006 | Jiang | 455/432.1 |
| 2007/0036330 A1* | 2/2007 | Wagner et al. | 379/265.01 |
| 2007/0211876 A1* | 9/2007 | Othmer et al. | 379/201.01 |
| 2007/0263603 A1* | 11/2007 | Schmitt | 370/356 |
| 2009/0271469 A1 | 10/2009 | Benco et al. | |
| 2010/0111273 A1* | 5/2010 | Strommer | 379/114.05 |
| 2010/0144344 A1* | 6/2010 | Jiang | 455/433 |
| 2011/0003601 A1 | 1/2011 | Coutts et al. | |
| 2011/0077047 A1* | 3/2011 | Epp et al. | 455/556.1 |
| 2011/0134804 A1* | 6/2011 | Maes | 370/259 |
| 2012/0036282 A1 | 2/2012 | Chen et al. | |
| 2012/0264400 A1 | 10/2012 | Khan et al. | |
| 2013/0089025 A1* | 4/2013 | Titcombe et al. | 370/328 |

FOREIGN PATENT DOCUMENTS

| | | |
|---|---|---|
| WO | WO 2009/068861 | 6/2009 |
| WO | WO 2009/101638 | 8/2009 |
| WO | WO 2011/001171 | 1/2011 |
| WO | WO 2011/107806 | 9/2011 |

OTHER PUBLICATIONS

UK Intellectual Property Office Search Report for GB1205907.7 dated Apr. 2, 2013 relating to claim 16.

UK Intellectual Property Office Search Report for GB1205907.7 dated Apr. 2, 2013 relating to claim 17.

* cited by examiner

NETWORK ARCHITECTURE

CROSS REFERENCE TO RELATED APPLICATIONS

This application claims priority to United Kingdom Application Number 1105565.4, filed on Apr. 1, 2011, which is incorporated herein by reference in its entirety.

BACKGROUND OF THE INVENTION

Legislation and regulation in many countries and states mandates call recording for banks, insurance companies, trading houses and other financial institutions. Since mobile telephones are increasingly being used for communications in such institutions, it has become highly desirable, and in some cases necessary, to provide efficient and effective recording of calls and communications made using telecommunications networks.

An example of such regulation is the regulation set by the UK's Financial Services Authority, which requires that all calls and all electronic communications sent to and from the mobile telephones belonging to those employees of Financial Institutions that trade in shares and wholesale financial products be recorded and stored for a minimum of 6 months. Since these records may need to be used as evidence in criminal prosecutions, the storage system must ensure that the recordings are secure and tamper-proof. Calls and electronic communications that can not be recorded must not be allowed.

It may also be desirable to record mobile telephone calls for forensic, crime prevention or other purposes. Although recent financial regulation has highlighted the need for telephone call recording, there are of course numerous reasons why recording and subsequent checking or monitoring of calls and other communications may be advantageous.

A common requirement of call recording solutions is that mobile usage charges be attributed to the mobile subscriber's post-pay price plan, thus leaving the customer's charging structure unchanged.

Known call recording solutions have typically fallen into two categories: network-based (mobile phone agnostic) recording and mobile client-based (network agnostic) recording. Both types of system suffer from inherent drawbacks. These mobile call and SMS recording solutions are commonly offered by third-party system integrators, i.e. systems which integrate with conventional telecommunications networks.

In the network based system, complications occur when roaming or when communications are instigated between external mobile telephones and telephones comprising part of a private branch exchange or PBX. Roaming is particularly problematic since many networks do not provide the functionality that allows for efficient recording, or if they do, complicated agreements are required between network operators in order to implement such functionality at the local level.

Additionally, it has been common, either intentionally to circumvent the recording systems or otherwise, for users to replace the SIM in their handsets with another SIM. The system which may be configured to record only those communications associated with a particular SIM, may no longer record these communications.

Two fundamental issues have meant that it is not currently possible for network operators to offer a network-based (mobile phone agnostic) solution.

Firstly, the recordal of Mobile Originating (MO) SMS is not possible without the necessary SMSC functionality. Additionally, Mobile Terminating (MT) SMS is not possible without deploying "SMS Home Network Routing".

Secondly, the requirement to record MO calls whilst roaming is not possible without Customised Application for Mobile network Enhanced Logic (CAMEL) service capability. It is possible to prevent the mobile subscriber from roaming onto any Public Land Mobile Network (PLMN) that does not support CAMEL. Whilst this approach might not be too restrictive in most European countries, this approach severely restricts roaming opportunities in North America and entirely removes all roaming opportunities in China.

As a result of the SMS issues, it is necessary to employ a mobile client-based system to perform SMS recording. The alternative option of not provisioning SMS services on mobile subscriptions for financial institutions is highly undesirable.

Various client-based solutions may address the above issues, but carry inherent problems of their own. Indeed most of the mobile call and SMS recording solutions being offered by third-party system integrators are entirely mobile client-based (network agnostic) solutions. In the main, these solutions are not entirely without flaw and the user experience is often poor.

In a known client based system, a client installed on the mobile device records each conversation through use of the devices internal microphone or other means. Typically, the stored conversation may then be forwarded to a remote storage server using a data connection on the device. This is undesirable for a number of reasons, including the high use of data bandwidth, which is particularly relevant when roaming. Additionally, the SIM of the user may commonly be transferred to another handset. This handset may not have the client installed and so call recording may no longer be possible. Further, client-based systems must be redesigned for each handset type, in fact some handsets may not allow clients to access key systems required in order to effectively record conversations.

Another known client-based call recording system is described in WO2009/068861, WO2011/001171 and WO2011/107806, for which the applicant is Compliant Phones Ltd (CPL). The CPL system comprises an electronic call centre or gateway. A client on the device intercepts outbound calls and instead dials an access number. Once connected to the call centre, the client transmits the originally dialled number to the call centre which connects the call. The call centre then intercepts the communication and stores it as it routes the communication, thereby acting as a 'middle man'.

There is a need for a system and method for recording communications for a particular user or group of users. Preferably, the recordal should not be affected by roaming, SIM replacement or removal and should not affect current charging structures.

SUMMARY OF THE INVENTION

According to a first aspect of the present invention there is provided a telecommunications system comprising a mobile device and an IP Multi-media Sub-system (IMS), the mobile device being connected to a Public Land Mobile Network, PLMN, wherein: the mobile device is adapted to: identify if the PLMN supports Customised Applications for Mobile network Enhanced Logic, CAMEL; and, upon receiving an attempt to initiate a call to a dialled number, if the PLMN supports CAMEL, allow the call to proceed; the PLMN is adapted to: receive a request to connect a call from the mobile device; invoke a CAMEL service trigger indicating that the call should be routed to the IMS; and, route the call to the IMS, and, the IMS is adapted to: control the call; and, refer the call to a call storage system for call storage. The mobile device may be further adapted to, upon receiving an attempt to initiate a call to a dialled number and if the PLMN does not support CAMEL, prevent the call from proceeding.

According to a second aspect of the present invention, there may be provided a telecommunications system comprising a mobile device and an IP Multi-media Sub-system (IMS), the mobile device being connected to a Public Land Mobile Network, PLMN, for routing a call, wherein the mobile device is adapted to: identify if the PLMN supports Customised Applications for Mobile network Enhanced Logic, CAMEL; upon receiving an attempt to initiate a call to a dialled number, if the PLMN does not support CAMEL, send a data message to the IMS including the dialled number; receive a pseudo-roaming number from the IMS; and, initiate a call to the pseudo-roaming number, and, the IMS is adapted to: receive a data message including the dialled number; return a pseudo-roaming number associated with the IMS; receive the call; refer the call to a call storage system for call storage; and, connect the call to the dialled number.

The present invention thus provides a hybrid network assisted, client-based solution for the recording of mobile telephone calls. The mobile device can also be employed to overcome the dependency upon CAMEL for roaming. In contrast to a client-based system, the hybrid solution provides that all user charging components for the voice recording solution can be fully integrated with the mobile subscriber's bill.

Being a network-assisted (rather than a network agnostic) solution, the described mobile call recording proposition can take advantage of network features, for example, INAP, CAMEL and USSD, to significantly improve the user experience for Mobile Originated (MO) and Mobile Terminated (MT) call scenarios.

Additionally, the present invention provides quicker call set up than a known IP Message call recording procedure, for example, less than 500 ms. Compared to the known IP message call recording procedure, the present invention does not require IP data coverage to avoid DTMF fall back and will not cause "ghost calls" resulting from mobile network congestion. Use of an IMS in the system avoids PSTN interconnect charge incurred by incurred by the network operator in order to get the call to the storage solution. Further, the operator can differentially charge on-VPN and on-Net mobile calls and can charge the mobile originated call directly to the originating user.

Since the recording is routed through the network, the system ensures that the user is still a subscriber and respects the mobile subscriber's "international calls" and "premium rate calls" bars. The user's Mobile Originated calls can also be recorded even if they remove their SIM from their authorised mobile handset.

The telecommunications system may further comprise a Subscriber Identification Module, SIM, for inserting into the device, the SIM adapted to prevent call connection if an International Mobile Equipment Identity, IMEI, of the mobile device does not match an expected IMEI. This functionality ensures that Mobile Originated calls whilst roaming in a non-CAMEL compliant PLMN will always be recorded, even if the SIM is inserted into a device that does not provide for client based call recording.

Additionally, when the mobile device sends an SMS message, the mobile device may be further adapted to store the SMS message by: sending an IP data message corresponding to the sent SMS message to an SMS storage system where the connected PLMN is a home PLMN and where IP data coverage is available, and, sending a replica of the sent SMS message to the SMS storage system where the mobile device is roaming on a foreign PLMN or where IP data coverage is not available. If the destination of the SMS matches one of a predetermined list of destinations stored on the mobile device, the mobile device may not store the SMS. In this way, a system for the recordal of SMS message is provided, and, additionally, messages that may be directed to network based services may not be recorded.

The identifying if the PLMN supports CAMEL may comprise evaluating the PLMN against a list of PLMNs that support CAMEL stored on the mobile device. Further, the IMS may be further adapted to send a list of PLMNs that support CAMEL to the mobile device, and wherein the mobile device is adapted to store the list upon receipt of the list from the IMS. In this way, if a PLMN is amended to support CAMEL, the device may use the CAMEL procedures to record the call.

Additionally, if the dialled number matches one of a predetermined list of numbers stored on the mobile device, the mobile device may be adapted to allow the call to proceed irrespective of whether the PLMN supports CAMEL. Thus, emergency services calls are not interfered with.

The IMS may be further adapted to audibly indicate to one or more parties of the call that the call is being recorded. This may be necessary to comply with privacy requirements.

The mobile device of the second aspect of the present invention may be further adapted to: upon receiving an attempt to initiate a call to a dialled number, if the PLMN supports CAMEL, allow the call to proceed, the telecommunications system further comprises the PLMN, wherein the PLMN is adapted to: receive a request to connect a call from the mobile device; invoke a CAMEL service trigger indicating that the call should be routed to the IMS; and, route the call to the IMS, and the IMS is further adapted to: control the call; and, refer the call to a call storage system for call storage.

A mobile device adapted for use in the telecommunications system of any aspect of the present invention may also be provided. An IP Multi-media Sub-system (IMS) adapted for use in the telecommunications system of any aspect of the present invention may also be provided.

According to a third aspect of the present invention, there may be provided a method in a mobile telecommunications device, comprising: identifying if the PLMN supports Customised Applications for Mobile network Enhanced Logic, CAMEL; upon receiving an attempt to initiate a call, if the PLMN supports CAMEL, allowing the call to proceed; if the PLMN does not support CAMEL, sending a data message to the IMS including the dialled number; receiving a pseudo-roaming number from the IMS; and, initiating a call to the pseudo-roaming number.

According to a fourth aspect of the present invention, there may be provided a telecommunications network comprising a core network and an IP Multi-media Sub-system (IMS), wherein: the core network is adapted to: receive a call including a requested destination; if the call should be recorded, invoke a Customised Applications for Mobile network Enhanced Logic, CAMEL, service; and, refer the call to the IMS, and wherein, the IMS is adapted to: receive the call from the core network; initiate a conference call to a media storage platform; and, connect the call to the requested destination.

According to a fifth aspect of the present invention, there may be provided a mobile telecommunications device being connected to a Public Land Mobile Network, PLMN, wherein the mobile device is adapted to, when the mobile device sends an SMS message, store the SMS message by: sending an IP data message corresponding to the sent SMS message to an SMS storage system, where the connected PLMN is a home PLMN and where IP data coverage is available, and, sending a replica of the sent SMS message to the SMS storage system where the mobile device is roaming on a foreign PLMN or where IP data coverage is not available.

According to a sixth aspect of the present invention, there may be provided a Subscriber Identification Module, SIM, for inserting into a mobile device, the SIM adapted to prevent call connection if an International Mobile Equipment Identity, IMEI, of the mobile device does not match an expected IMEI such that calls made using the SIM can be prevented when made using an unauthorised mobile device.

DETAILED DESCRIPTION OF THE DRAWINGS

An example of the present invention will now be described in detail with reference to the accompanying drawings, in which.

GLOSSARY

Figure 1:
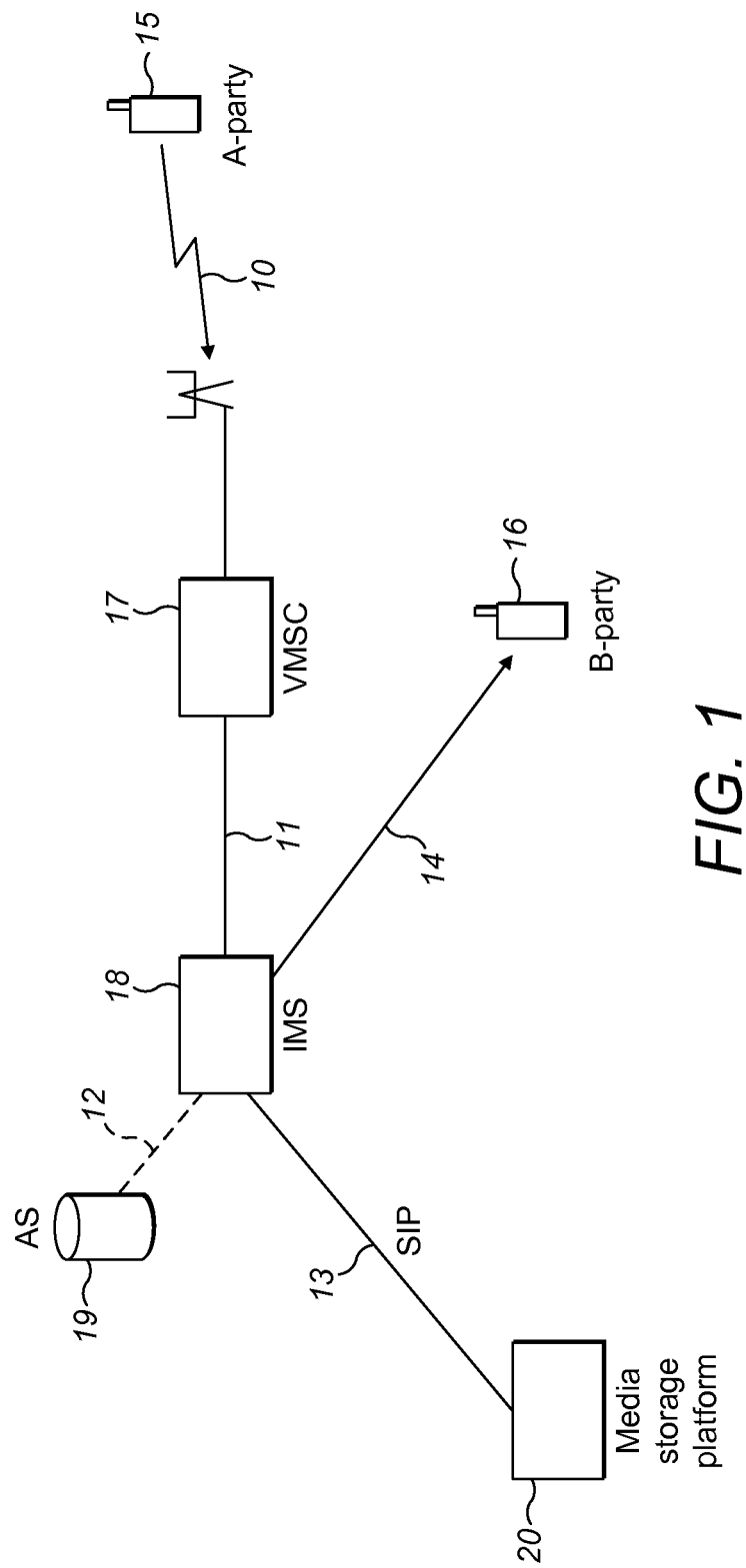
FIG. 1 shows a first embodiment of the present invention for Mobile Originated recording in the home PLMN.

A-party Calling party
ACM Address Complete Message, a Signalling System#7 message
APN Access Point Name
AS Application Server
ASAP Automatic Service Activation Programme, a service provisioning system for IMS-based services
ASN1 Abstract Syntax Notation 1
BAN Billing Account Number
BES Blackberry Enterprise Server
BCS Business Communication Suite, allows non-SIP terminals (using the GSM network) to be able to invoke services from the IMS Core and SIP Application Servers
B-party Called Party
BSC Base Station Controller
CA Call Anchoring, term used to describe the concept whereby call control for the mobile is performed by an entity outside of the Visited Mobile Switching Centre
CAMEL Customised Application for Mobile network Enhanced Logic
CD Call Deflection
CDR Call Detail Record
CFB Call Forward Busy
CFNR Call Forward No Reply
CFNRc Call Forward Not Reachable
CFU Call Forward Unconditional
CgPN Calling Party Number
CLI Calling Line Identity
CLIP Calling Line Identity Presentation
CLIR Calling Line identity Restriction
CORP_ID Corporate Identity, the customer reference in a retail billing system
C-party Diversion destination party
CPE Customer Premises Equipment
CS Circuit Switched
CSD Circuit Switched Data
CTN Cellular Telephone Number, used to describe a mobile subscription
CUR Common User Repository, database holding service related subscription data
DTMF Dual Tone Multi-Frequency
DTAP Direct Transfer Application Part, the GSM call control signalling protocol which was derived from the ISDN signalling protocol.
E164 A telephone number in the format defined in ITU-T Recommendation E.164
EMM Ericsson Multi-Mediation, IMS CDR mediation system
FSA Financial Services Authority
FTP File Transfer Protocol
GMSC Gateway Mobile Switching Centre
GSM Global System for Mobile communications
HEC Hosted Enterprise Communications, Fixed Mobile Convergence system for multi-national corporate customers
HLR Home Location Register
IM Instant Messaging
IMEI International Mobile Equipment Identity
IMS IP Multi-media Sub-system
IP Internet Protocol
ISAAC International Subscriber Administration And Control system, a subscriber provisioning system
ISDN Integrated Services Digital Network
ISDN-30 BT's Integrated Services Digital Network Primary Rate Interface product
IWF Inter-Working Function
MO Mobile Originated
MCF Mobile Call Forward
MGC Media Gateway Controller, a component of an IMS
MMS Multimedia Messaging Service
MRF Media Resource Function, a component of an IMS
MSC Mobile Switching Centre
MSISDN Mobile Station International Subscriber Directory Number
MT Mobile Terminated
MVPN Mobile Virtual Private Network, a community of mobile subscriptions
NGIN Next Generation Intelligent network Node
OICK Originating Intelligent networking Category Key
OMO Other Mobile Operator
On-NET A call between two subscriptions on the same mobile network (but not in the same Mobile VPN)

On-VPN A call between two subscriptions within the same Mobile VPN (and typically within the same customer Billing Account)
PLMN Public Land Mobile Network
PNP Private Numbering Plan
PS Packet Switched
PSTN Public Switched Telephone Network
RADIUS Remote Authentication Dial In User Service
RCSe Rich Communications Suite enhanced
SBC Session Border Controller, a component of an IMS
SIM Subscriber Identity Module
SIP Session Initiation Protocol
SMEs Small and Medium Enterprises
SMS Short Message Service
SOC Service Order Code, a subscription feature that is attached to the subscription
SSL Secure Sockets Layer
TICK Terminating Intelligent networking Category Key
UK ISUP United Kingdom Integrated Services User Part variant of signalling system#7
USSD Unstructured Supplementary Service Data
VMSC Visited Mobile Switching Centre.

DETAILED DESCRIPTION

The following describes the concepts of an operator group operated, network-assisted, client-based, mobile call and SMS recording proposition.

The calls and SMS messages pertaining to the mobile users that are subscribing to this service will be recorded, stored and retrieved from customer-owned Customer Premises Equipment (CPE) for enterprise entities (although a network hosted call and SMS recording, storage and retrieval system may also be available for those entities that prefer this variant).

A smart phone client will actively participate in Mobile Originated (MO) and Mobile Terminated (MT) SMS recording functions and will also allow MO call recording to be performed when the mobile user is roaming on those foreign PLMNs which do not support Customised Application for Mobile network Enhanced Logic (CAMEL).

The example described herein proposes to use an operator group controlled Next Generation Intelligent network Node (NGIN) and Application Server as the starting point for the Mobile Call Recording service. In this way the solution is developed once and re-used for a number of operators. It will be understood that the concepts described are equally applicable to a single operator network or a group of networks.

The conceptual, exemplary, design includes the following features:
i) Support for recording of MO calls in home PLMN, in foreign PLMNs that supports CAMEL and in foreign PLMNs that don't support CAMEL, that is, will operate on any PLMN that has a roaming agreement with the home operator.
ii) Guaranteed recording of calls (such that if the call can not be recorded, the call will not be established),
iii) Reporting each IMEI update for the mobile subscriber and generating an alert notification to the entities customer's administrator when the IMEI is not one that has been declared by the entity,
iv) SIM Toolkit application on the mobile subscriber's SIM which verifies that the IMEI of the mobile handset corresponds to that registered within the SIM toolkit application.
v) The provision of an "intrusion warning tone" for Mobile Originated and Mobile Terminated calls and the provision of a post-connection announcement for Mobile Call Forwarded calls, to indicate to all parties involved in the call that the call is being recorded,
vi) If the mobile subscription has both a restricted roaming list (comprising only CAMEL compliant PLMNs) and no SMS services provisioned, the solution becomes entirely network-based, i.e. the mobile user does not require the Client installed on their mobile phone, nor the SIM toolkit application installed on their SIM.

The described exemplary implantation may include the following components:

A Mobile smart phone client which will participate in MO & MT SMS recording and MO call recording (or MO call anchoring) on those foreign PLMNs that do not support CAMEL.

A mobile call recording service logic and new USSD interface on the NGIN or Application Server.

A SIP connectivity which may provide connectivity to deliver call media from the IMS to the customer's call and SMS recording and storage system (CPE or Hosted).

A CPE-based or Hosted call and SMS recording and storage function which may receive call media from the SIP trunk and receive SMS from the Centralised SMS distribution server and, providing that the other party involved in the call or SMS is not on the user's personal white-list, record it and store it.

A CPE-based/Hosted call and SMS retrieval function which may allow customers to access the call media and SMS messages for their users.

A known SMS Aggregator which may send the copied SMS messages to the centralised SMS distribution server.

A centralised SMS distribution server which may reformat SMS and send them to the relevant customer's call and SMS storage system and will receive IMEI update reports and send them to the relevant customer's call and SMS recording and storage system.

A centralised client management server which may update the CAMEL compliant PLMN list on the client ("Pulled" from Client using IP connectivity) and activate and passivate the client, update the network white list of SMS senders and update the network white list of dialled telephone numbers, change the IP Message addresses used for SMS recording and change the SMS Aggregation address for SMS recording and provision the mobile subscriptions into the Centralised SMS distribution server.

A known ISAAC which may provision the call and SMS recording mobile subscription on the mobile network for example HLR and Voicemail etc) and will provision the call and SMS recording mobile subscriptions into the Centralised Client Management server.

A known Corporate Gemini which will provision the call and SMS recording mobile subscription within the retail billing system and initiate the provisioning of the call and SMS recording mobile subscription on the mobile network via ISAAC.

A mobile device manager, for example, the BES server in the case of Blackberry mobile handsets, to load the client onto the Smart Phone and to prevent unauthorised mobile clients such as Skype, IM etc., being loaded on to the Smart Phone.

An HLR which may generate a notification via the Centralised SMS Distribution server to the CPE-based or Hosted call and SMS recording and storage platform when the Mobile Subscriber's IMEI is updated.

A SIM toolkit application installed on SIM will verify the IMEI of the handset for each Mobile originated call attempt in order to prevent unrecordable calls being originated whilst the SIM being installed in a mobile device whilst roaming on a non-CAMEL compliant PLMN A network voicemail platform which does not permit "direct deposit" (this is necessary to prevent messages being deposited without being recorded and then being collected from another device) and does not permit Call Return (this is necessary because that the destination telephone number of the Call Return call wouldn't be conveyed to the Call recording platform).

Three, equally viable, alternative mobile call recording architectures are described as exemplary implementations of the present invention.

The first architecture, which is implied throughout the remainder of the document, sees the service intelligence shared between the NGIN/Application Server and a combined call recording and storage system. The NGIN/Application Server is responsible for controlling the "real" call and generating the recording-leg call to the combined call recording and storage system. The combined call recording and storage system is responsible for controlling the "intrusion warning tone" and the "post-connection announcement" and responsible for deciding whether to record the call. In this architecture, the combined call recording and storage system may be customer premise-based or may be hosted by the network operator.

The second architecture sees the service intelligence almost entirely within the NGIN/Application Server. The NGIN/Application Server is responsible for controlling the "real" call and generating the recording-leg call and controlling the "intrusion warning tone" and the "post-connection announcement". The combined call recording and storage system is merely responsible for deciding whether to record the call. In this architecture, the combined call recording and storage system may be customer premise-based or may be hosted by the network operator.

Like the second architecture, the third architecture sees the service intelligence almost entirely within the NGIN/Application Server. The NGIN/Application Server is responsible for controlling the "real" call and generating the recording-leg call to the Call Recording function and controlling the "intrusion warning tone" and the "post-connection announcement". However, in this third architecture, the Call Recording function and Call Storage function are no longer performed on the same element. Instead, the Call Recording function is performed within the operator's estate. On completion of the 'real' call, the Call Recording function will send a file containing a copy of the call content and call related details to the Call Storage function. The Call Storage function is merely responsible for deciding whether to store the call. In this architecture, the Call Storage system may be customer premise-based or may be hosted by the network operator.

The description herein suggests that call media delivery to the Call Recording platform should be achieved using one single SIP connection (and the IMS MRF used to perform the conference function). Alternatively, call media delivery to the customer's Call Recording platform could be achieved using two SIP connections from the SBC (where one connection is for the A-Party Tx and the other connection is the B-party Tx) and the Call Recording platform used to associate these two SIP call legs. Although this alternative arrangement would not require the MRF and would offer an opportunity for "stereo" media recordings, it would consume twice the bandwidth of the SIP trunk and would elevate the SIP Trunk connection to the Call Recording platform as critical to the success of the "real" call, even when the customer had determined that call recording was only required to be "best endeavours" (rather than "Compelled"). It would also allow the Call recording platform to return the intrusion warning tone to the appropriate call leg. Consequently, it is considered that this alternative procedure to deliver the call media to the Call Recording platform only be preferable for the third Architecture option, i.e. it is not deployed when the Call Recording platform is located on the customer's premise.

Exemplary call and SMS recording implementations will now be described in detail.

Mobile Originated Call (on Home Network)

FIG. 1 illustrates an exemplary implementation of the present invention for handling and recording Mobile Originated calls when on the home network.

The mobile user first dials the telephone number of B 16 ("01635677899"). The client determines that intervention is not required, thus allowing the mobile 15 to send "01635677899" to the VMSC 17 (step 10). The VMSC 17 sends call to the IMS 18 (step 11). The IMS 18 refers the call to the AS 19 (step 12). The AS 19 instructs the IMS 18 to initiate a conference call to the Media Storage Platform 20 (step 13). The AS 19 instructs the IMS to initiate a real call to B 16 ("01635677899", step 14). If the call encounters any ISDN/GSM call forwarding then the AS 19 will notify this to the Media storage platform 20.

Figure 2:
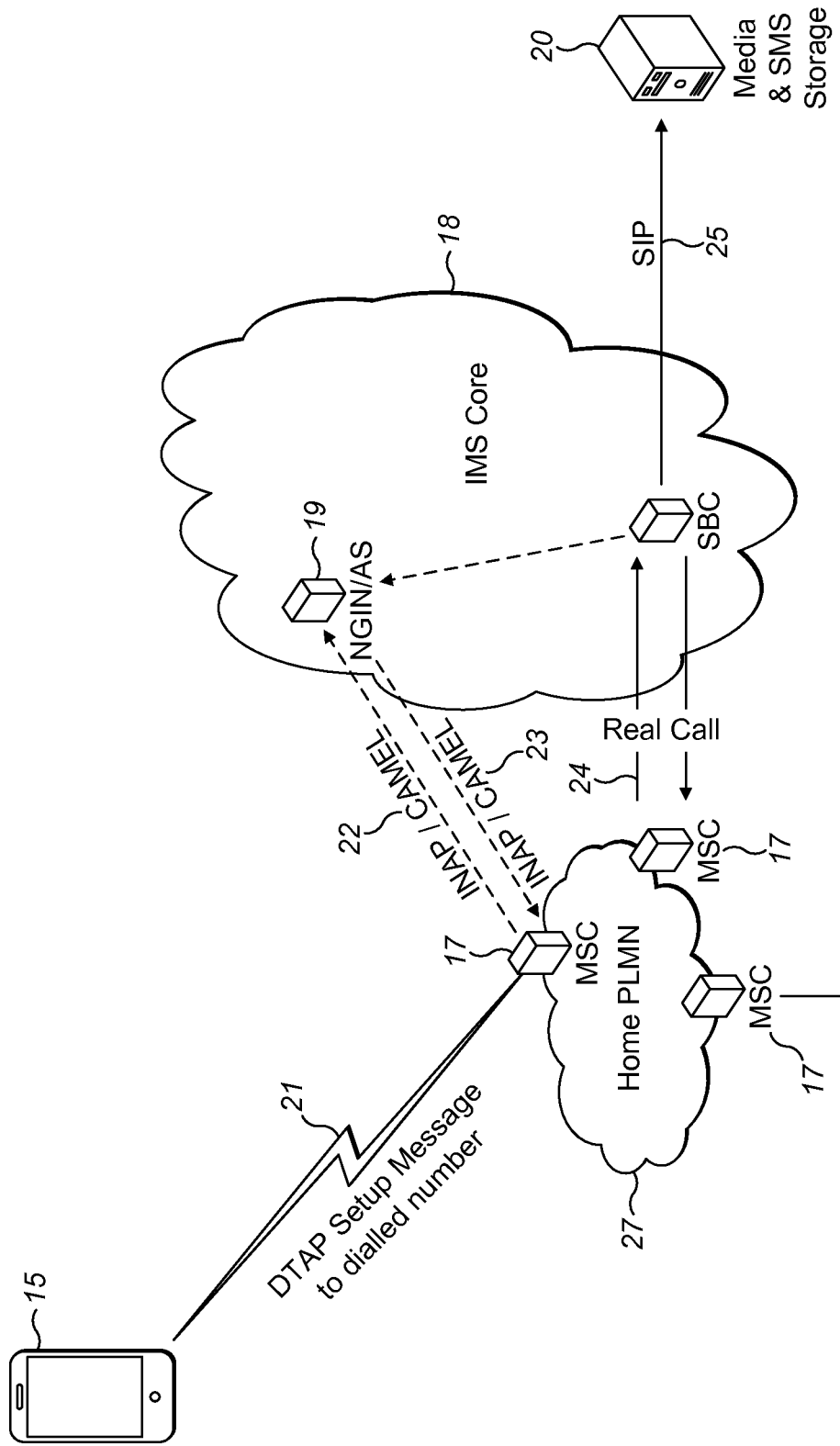
FIG. 2 shows an alternative embodiment of the present invention for Mobile Originated recording in the home PLMN.

A more detailed embodiment of MO recording on the home network will now be described. This detailed embodiment is illustrated in FIG. 2. First, the client will analyse the dialled digits to determine whether an emergency telephone number eg 999, 112, 911 etc. has been dialled. If an emergency telephone number has been dialled, the client will not modify the dialled digits or participate further in the call setup but will allow the call to proceed unhindered. If an emergency telephone number has not been dialled, the client will determine what network 27 the mobile subscriber is currently registered on.

Recognising that it's not roaming, the client shall instruct the mobile device to send the DTAP SETUP message 21 with the Called Party BCD Number information element's Type of Number as dialled eg "international" or "unknown" and Number Digits comprising only the "user dialled destination digits".

A SIM toolkit application shall verify that the IMEI corresponds to the user's registered handset (which has the client installed). If the IMEI is not verified, the call attempt will not be allowed. Otherwise the DTAP SETUP message 21 is allowed to be sent to the VMSC.

The mobile subscription will have been provisioned with the INAP/CAMEL service trigger which will have been stored in the VLR.

The NGIN/AS 19 will receive the INAP/CAMEL IDP 22 from the VMSC 17 and will store the Called Party BCD Number and Calling Party Number parameter (including APRI) against a correlation Identity number and shall return a Pseudo-routing Number (comprising <HomeCountryCode> <NationalNumberGroup> <Correlationidentity>) within the INAP/CAMEL CONNECT 23 message.

In the event that a INAP/CAMEL signalling error occurs, the call attempt shall not be allowed to proceed i.e. the mobile subscriber's INAP/CAMEL O-CSI parameter "default_ch" shall be configured with the value "RELEASE".

The VMSC 17 shall route the call using the Pseudo-Routing Number to the IMS 18. The MO CDR (generated by the VMSC) will be discarded using existing procedures.

The NGIN/AS 19 will receive the SIP INVITE and, using the correlationID value within the REQUEST-URI be able to determine the call originator and the original dialled digits and CLIR selection and the VLR address. It may be noted that CLI presentation is dependant upon CAMEL signalling rather than it's conveyance across the international PSTN. Having identified the originating user, the Application Server first looks at the user dialled digits to see if a public translation number exists in the PNP, if so it applies the translation.

The NGIN/AS shall then perform number normalisation as follows:

| Original Dialled Number (as received in the CalledPartyBCDNumber parameter of the IDP) | Example | Original NOAI | Normalisation function |
|---|---|---|---|
| E164 formatted number commencing with a valid country code i.e. where the mobile user prefixed the E164 formatted number with the "+" sign). Note: The "+" sign shall be removed by the Mobile Handset (and converted by changing the Calleo Party Number IE's "Type of Number" to the value International"). Consequently, the original Dialled Number shall reach the NGIN/AS without the "+" sign | +441635677899 | International | Original Dialled Number needs no normalisation. |
| International dialling, using the appropriate International Dialling Access Code applicable to the Country/VPLMN. Note: The NGIN/AS is required to determine the appropriate International Dialling Access Code(s) eg "00" (as used within most of Europe) or "011" (as used within North America) or "810" (as used in Russia) or "0011" (as used in Australia) etc. for the country/VPLMN being roamed in | 00441635677899 | Unknown | The IDAC prefix shall be removed from the Dialled Number to generate the E164 number e.g. '441635677899' |
| Local national dialling to a local national telephone number, using the National Dialling Access code applicable to the UK. | 037662222 | Unknown | NDAC prefix is removed from Dialled Number and replaced with the E164 international country code of the roamed country to form the E164 number e.g. '97237662222' |
| Local national dialling to a local national telephone number | 37662222 | National | The E164 country code of the UK shall be prefixed to Dialled Number to form the E164 number e.g. '4437662222'. |
| Network short code | 121 | Unknown | Normalisation or translation not necessary. |

The Application Server then looks at the translated/null translated digits to determine if the originating user dialled an international telephone number or UK premium rate telephone number. If so, the Application Server checks that the originating user has the appropriate calling privileges by performing a "HLR Test Call". The Application Server then determines whether the Called Party is the E164 msisdn of another user belonging to the same customer group. If the Called Party is the E164 msisdn of another user belonging to the same customer group, then on-VPN charging shall apply.

A copy of the call media is sent to the customer's Call Recording platform using SIP signalling 25. Within the SIP Call-Info Header (with Purpose=info) supplied within the SIP INVITE or in a separate SIP INFO message, the following call related details will be conveyed: "Call Type=MO", "A-Party" {user's E164 msisdn}, "DialledDigits" {derived by the AS from the CalledPartyBCDNumber in the IDP} and "B-Party" {derived by the AS from the outgoing Request-URI}. The answer signal pertaining to the real call 24 will be signalled to the Call Recording platform using the (very delayed) ACK for the 200 Final Response returned by the Call Recording platform for the SIP INVITE (or alternatively using a SIP INFO message). If the connection to the Call Recording platform can not be established, the Application Server may reject the call attempt or proceed with the call attempt based on customer-determined configuration and an announcement played to the caller. Similarly, if the SIP connection 25 to the Call Recording platform is ended prematurely, the Application Server may tear-down the real call (after an announcement is played to both parties) or allow the real call to proceed based on customer-determined configuration. Being a single SIP connection, the forward and backward transmission paths of the "real call" will be merged together as a "mono" media delivery to the Call Recording platform i.e. speech from the A-party and B-party will be merged together.

The Application Server 19 routes the outgoing call leg of the "real call" 26 to the intended destination via the PLMN as shown below:
INVITE: Request-URI=E164DestinationAddress, P-Asserted_ID=CallingUser's E164 msisdn, PRIVACY=id (if user has chosen to restrict their CLI), FROM=E164 msisdn (else Anonymous@invalid if user has chosen to restrict their CLI)

It is noted that it is always possible that the real MO call will encounter a call diversion. It is unfortunate that whilst UK ISUP signalling conveys all of the relevant signalling information pertaining to the diversion encounter, the SIP is unable to properly convey all of this information back to the SIP-based Application Server using a standards-based method. Consequently, this document proposes that the SIP>UK ISUP IWF be modified in a proprietary manner in order to map the contents of the UK ISUP Redirection Number and Call Forwarding Information parameters (returned in the UK ISUP Address Complete Message or the Call Progress Message that is used to convey the Alerting event) into a (backward direction) SIP Diversion Header and pass this back to the Application Server in the "181" Call Forwarding provisional response. Alternatively, the SIP>UK ISUP IWF may use a SIP INFO message to convey the "backward direction" Diversion Header to the AS. Upon receipt of this "backward direction" Diversion Header in the 181 Call Diverting provisional response or in the SIP INFO message, the AS will convey the "backward direction" Diversion Header to the customer's Call Recording Platform in a SIP INFO message.

Upon answer, the answer condition shall be signalled from the AS to the Call Recording Platform in a SIP INFO message. If the called party (or redirection number) is on the originating user's personal white-list the call will not be recorded, otherwise the call will be recorded. If the call is to be recorded, customer configuration on the Call Recording platform will determine whether an intrusion warning tone eg a double-beep every ten seconds, is to be provided. Note: if the delivery of the media is to be achieved using a single call (mono delivery), the intrusion tone will be returned from the Call recording Platform and heard by both the called party and the calling party. However, if the transmission paths of the calling party and called party are to be delivered separately (stereo delivery) the call recording platform, then the intrusion warning tone should be returned to the called party only. If the intrusion warning tone is to be provided by the Call Recording platform, it will commence immediately upon receipt of the answer indication. It is noted that if the call is to another user belonging to the same customer group, a customer option shall determine whether the intrusion warning tone is provided in this scenario.

The MSC-generated Mobile originated CDR will be priced by a retail billing system and passed to Central Billing via the CSA feed. This CDR will not be used for subscriber billing though it may be used to invoice the service provider.

NGIN shall generate the Mobile Originated CDR that will be used to charge the originating mobile subscriber through a Central Billing System.

Advantages of the described embodiment, compared to existing client based solution, include: quicker call set up than the IP Message procedure for example less than 500 ms; the system does not require IP data coverage to avoid DTMF fall back; the system does not rely on IP data coverage so will not cause "ghost calls" resulting from mobile network congestion; use of IMS AS avoids PSTN interconnect charge incurred to get the call to the Call Server; the Operator can differentially charge on-VPN and on-Net mobile calls; the Operator can charge the mobile originated call directly to the originating user; the system Ensures that the user is still a network subscriber; the system respects the mobile subscriber's "international calls" and "premium rate calls" bars; the user's MO calls will be recorded even if they remove their SIM from their authorised mobile handset; and, if both Mobile Roaming (and SMS services) are not required, the solution is SIM based i.e. it can use any handset because the client is not required.

The call flow of the above detailed exemplary implementation can be summarised as follows. First, the mobile user dials telephone number "01635677899". The client determines that intervention is not required, thus allowing the mobile to send "01635677899" to the VMSC. The VMSC sends INAP/CAMEL IDP to NGIN. The NGIN returns PRN within INAP/CAMEL CONNECT. The VMSC routes call to NGIN. The NGIN reconstitutes call using CorrelationID within PRN and normalises original dialled digits to E164 format. The AS instructs IMS to initiate conference call to the Call Recording Platform for the MO call. The AS instructs IMS to initiate real call to "+441635677899". If the call encounters any ISDN/GSM call forwarding then the AS will notify this to the Call Recording platform. Upon answer, the Call Recording platform will provide the "intrusion warning tone" to the Called Party only (stereo delivery) or both Called Party and Calling Party (mono delivery).

Mobile Originated Call (Roaming on a Camel Compliant PLMN)

Figure 3:
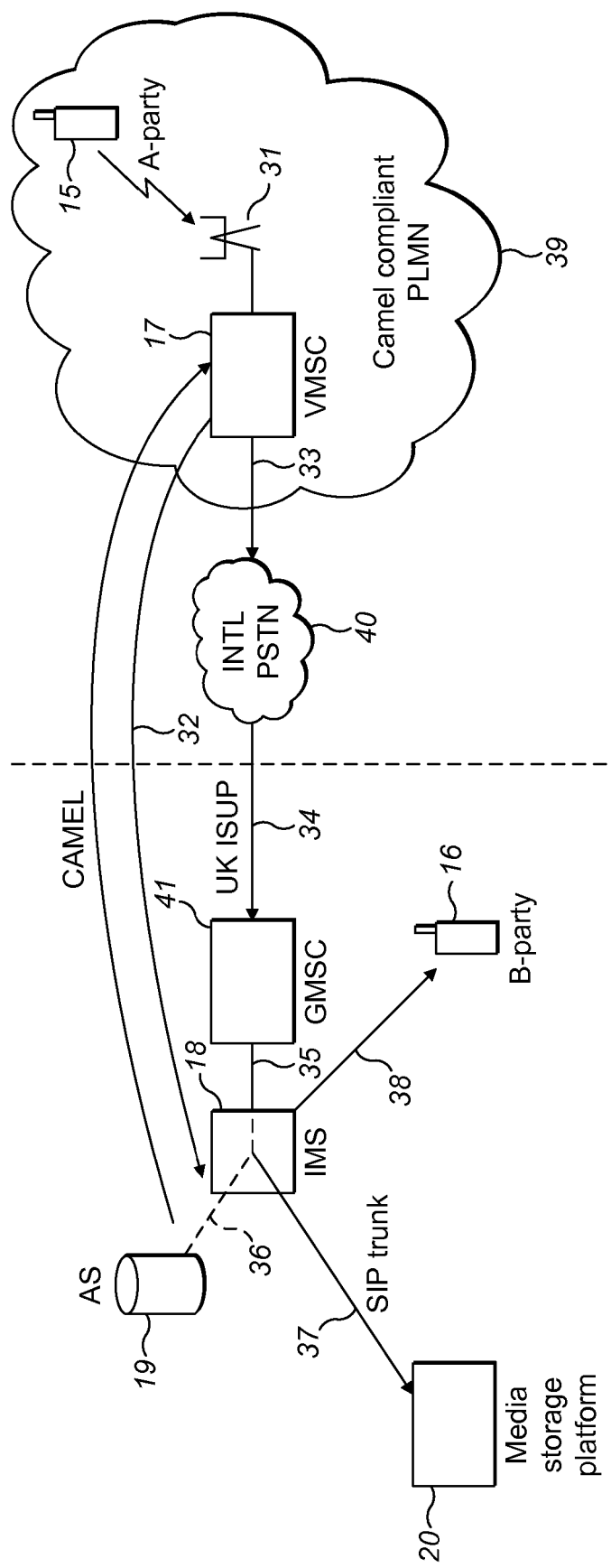
FIG. 3 shows a further embodiment of the present invention for Mobile Originated recording in a foreign PLMN.

FIG. 3 illustrates an exemplary embodiment, in which Mobile Originated calls are recorded whilst roaming on a CAMEL compliant PLMN 39. An example call flow is as follows. First, the mobile user dials telephone number of B 16 ("01635677899"). The client determines that intervention is not required, thus allowing the mobile to send "01635677899" to the VMSC 17 (step 31). The VMSC 17 invokes CAMEL service to AS 19 (step 32). AS 19 returns pseudo-roaming number to the VMSC 17. The VMSC 17 sends call to international PSTN 40 (step 33). The International PSTN carrier then sends the call to the home GMSC 41 (step 34). The GMSC 41 then sends the call to the IMS 18 (step 35). The IMS 18 then refers the call to the AS 19 (step 36). The AS 19 instructs the IMS 18 to initiate a conference call to the Media Storage Platform 20 (step 37). The AS 19 instructs the IMS 18 to initiate real call to B 16 ("01635677899", step 38). If the call encounters any ISDN/GSM call forwarding then the AS 19 will notify this to the Media storage platform 20.

Figure 4:
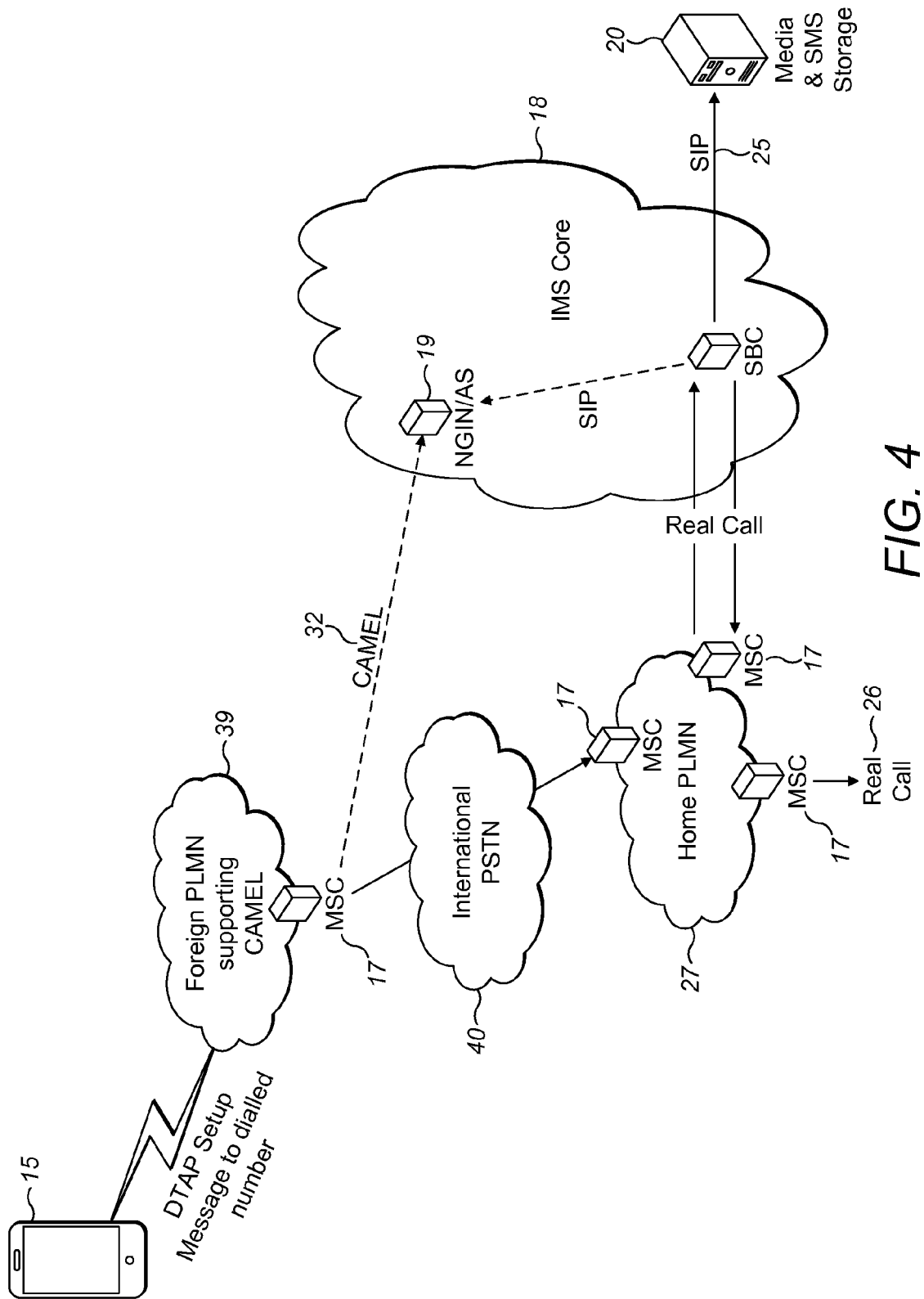
FIG. 4 shows a further embodiment of the present invention for Mobile Originated recording in a foreign PLMN.

A more detailed embodiment of MO recording on a CAMEL compliant network will now be described. This detailed embodiment is illustrated in FIG. 4. First, the client will analyse the dialled digits to determine whether an emergency telephone number, for example, 999, 112, 911 etc. has been dialled. If an emergency telephone number has been dialled, the client will not modify the dialled digits or participate further in the call setup but will allow the call to proceed unhindered. If an emergency telephone number has not been dialled, the Client will determine what network the mobile subscriber is currently registered on.

Recognising that it's roaming on a PLMN which does support CAMEL, the client shall instruct the mobile device to send the DTAP SETUP message with the Called Party BCD Number information element's Type of Number as dialled eg "international" or "unknown" and Number Digits comprising only the "user dialled destination digits.

A SIM toolkit application shall verify that the IMEI corresponds to the user's registered handset (which has the client installed). If the IMEI is not verified, the call attempt will not be allowed. Otherwise the DTAP SEPUP message is allowed to be sent to the VMSC.

The mobile subscription will have been provisioned with the CAMEL service trigger which will have been stored in the VLR.

The NGIN/AS 19 will receive the INAP/CAMEL IDP 32 for the originating service and will store the Called Party BCD Number and Calling Party Number parameter (with it's APRI value) and VLR address parameters against a correlation Identity number and shall return a Pseudo-routing Number (comprising <HomeCountryCode> <NationalNumberGroup> <Correlationidentity>) within the INAP/CAMEL CONNECT message 32.

In the event that a CAMEL signalling error occurs, the call attempt shall not be allowed to proceed ie the mobile subscriber's CAMEL O-CSI parameter "default_ch" shall be configured with the value "RELEASE".

The VMSC 17 shall route the call using the Pseudo-Routing Number to the IMS 18.

The NGIN/AS 19 will receive the SIP INVITE and, using the correlationID value within the REQUEST-URI, be able to determine the call originator and the original dialled digits and CLIR selection and the VLR address. It is noted that CLI presentation is dependant upon CAMEL signalling rather than it's conveyance across the international PSTN.

The NGIN/AS 19 shall perform number normalisation as follows:

| Original Dialled Number (as received in the CalledPartyBCDNumber parameter of the IDP | Example | Original NOAI | Normalisation function |
| --- | --- | --- | --- |
| E164 formatted number commencing with a valid country code i.e. where the mobile user prefixed the E164 formatted number with the "+" sign). Note: The "+" sign shall be removed by the Mobile Handset (and converted by changing the Called Party Number IE's "Type of Number" to the value International"). Consequently, the original Dialled Number shall reach the NGIN/AS without the "+" sign | +441635677899 | International | Original Dialled Number needs no normalisation. |
| International dialling, using the appropriate International Dialling Access Code applicable to the Country/VPLMN. Note: The NGIN/AS is required to determine the appropriate International Dialling Access Code(s) eg "00" (as used within most of Europe) or "011 (as used within North America) or "810" (as used in Russia) or "0011 (as used in Australia) etc. for the country/VPLMN being roamed in | 00441635677899 | Unknown | The IDAC prefix shall be removed from the Dialled Number to generate the E164 number e.g. '441635677899' |
| International dialling, using the appropriate International Dialling Access Code applicable to the Country/VPLMN. Note: The NGIN/AS is required to determine the appropriate International Dialling Access Code eg "00" (as used within most of Europe) or "011" (as used within North America) or "810" (as used in Russia) or "0011 (as used in Australia) etc. for the country/VPLMN being roamed in | 0097237662222 | National Note: the network would not expect this as a normal arrangement but have included it to accommodate possible exception cases | The IDAC prefix shall be removed from the Dialled Number to generate the E164 number e.g. '97237662222' |
| International dialling, using the appropriate International Dialling | 0097237662222 | International Note: the network would | The IDAC prefix shall be removed from the Dialled |

-continued

| Original Dialled Number (as received in the CalledPartyBCDNumber parameter of the IDP) | Example | Original NOAI | Normalisation function |
|---|---|---|---|
| Access Code applicable to the Country/VPLMN. Note: The NGIN/AS is required to determine the appropriate International Dialling Access Code eg "00" (as used within most of Europe) or "011" (as used within North America) or "810" (as used in Russia) or "0011" (as used in Australia) etc. for the country/VPLMN being roamed in. | | not expect this as a normal arrangement but have included it to accommodate possible exception cases | Number to generate the E164 number e.g. '97237662222' |
| Local national dialling to a local national telephone number, using the National Dialling Access code applicable to the country/VPLMN Note: The NGIN/AS is required to determine the appropriate National Dialling Access Code eg "0 for the country/VPLMN being roamed in. | 037662222 | Unknown | NDAC prefix is removed from Dialled Number and replaced with the E164 international country code of the roamed country to form the E164 number e.g. '97237662222' |
| Local national dialling to a local national telephone number Note: The NGIN/AS is required to determine the appropriate National Dialling Access Code eg "0 for the country/VPLMN being roamed in. | 037662222 | National Note: the network not expect this as a normal arrangement but have included it to accommodate possible exception cases | The NDAC prefix is removed from the Dialled Number and replaced with the E164 country code of the roamed country to form the E164 number e.g. '97237662222' |
| Local national dialling to a local national telephone number | 37662222 | National | The E164 country code of the roamed country shall be prefixed to Dialled Number to form the E164 number e.g. '97237662222'. |
| Network short code | 121 | Unknown | Normalisation or translation not necessary. |

From this point in the call, the call signalled to the AS 19 where it is handled as if it had been originated on the home network.

The VPLMN-generated TAP-in CDR will be priced by a retail billing system (based on the roamed network and the +44 pseudo-routing number) and passed to Central Billing via the CSA feed. This CDR will not be used for subscriber billing though it will be used to invoice the service provider.

The NGIN shall generate the Mobile Originated CDR that will be used to charge the originating mobile subscriber.

Advantages of the described embodiment, compared to existing client based solution, include: quicker call set up than the IP Message procedure, for example, call setup time typically 750 ms; the operator can differentially charge on-VPN and on-Net mobile calls; the operator can charge the network originated call leg directly to the originating user; the system ensures that the user is still a subscriber; the system respects the mobile subscriber's "international calls" bar and "premium rate calls" bar; the system ensures that the correct SIM is fitted to the client-enabled mobile handset; and, the system reduces the opportunity for a "man-in-the-middle" eavesdropper to make spoof calls.

The call flow of the above detailed exemplary implementation can be summarised as follows. First, the mobile user dials telephone number "01635677899". The client determines that USSD intervention is not required, thus allowing the mobile to send "01635677899" to the VMSC. The VMSC sends CAMEL IDP to NGIN. The NGIN returns PRN within CAMEL CONNECT. The VMSC routes call to the NGIN (via the home PLMN). The NGIN reconstitutes call using CorrelationID within PRN and normalises original dialled digits to E164 format. The AS instructs the IMS to initiate conference call to the Call Recording Platform for the MO call. The AS instructs IMS to initiate real call to "+491635677899". It is noted that if the call encounters any ISDN/GSM call forwarding then the AS will notify this to the customer's Call Recording platform. Upon answer, the customer's Call Recording platform will provide the "intrusion warning tone" to the Called Party only (stereo delivery) or both Called Party and Calling Party (mono delivery).

Mobile Originated Call (Roaming a PLMN that does not Support CAMEL).

Figure 5:
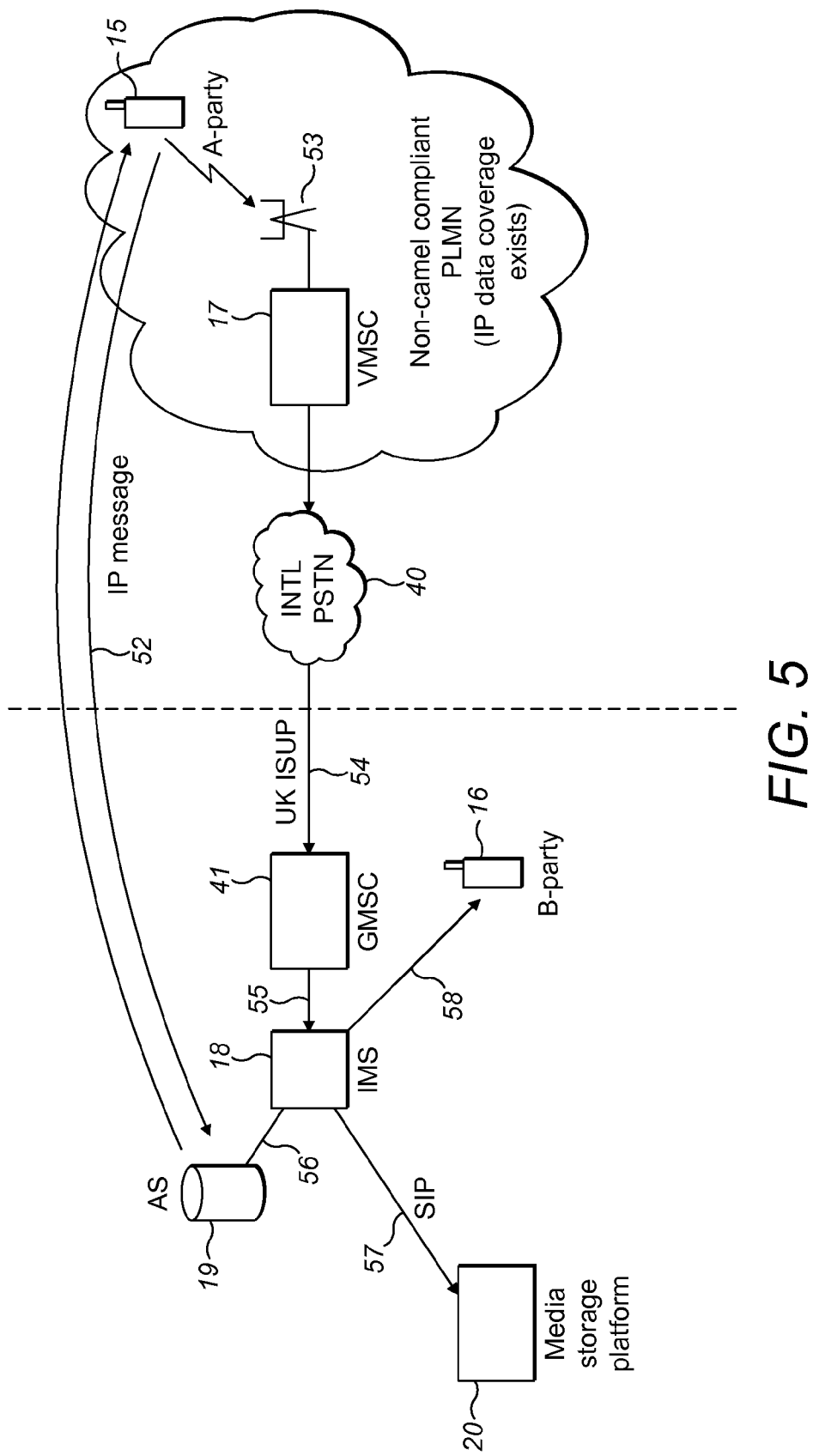
FIG. 5 shows a further embodiment of the present invention for Mobile Originated recording in a foreign PLMN.

FIG. 5 illustrates a system for recording Mobile Originated calls whilst roaming in non-CAMEL compliant PLMN where IP data coverage is available. First, the mobile user dials telephone number of B 16 ("01635677899"). The client determines that intervention is required. If an IP data session has been established, the Client invokes IP Message service 52 to AS 19. The AS 19 returns a pseudo-roaming number to the client on the mobile device 15. The mobile 15 then sends the pseudo-roaming number to the VMSC 17 (step 53). The VMSC 17 then sends the call to the international PSTN 40. The International PSTN carrier sends the call to the GMSC 41 (step 54). The GMSC 41 sends the call to the IMS 18 (step 55). The IMS 18 then refers the call to the AS 19 which will perform caller authentication (step 56). The AS 19 then instructs the IMS 18 to initiate a conference call to the Media Storage Platform 20 (step 57). Finally, the AS 19 instructs the IMS 18 to initiate real call to B 16 ("01635677899", step 58). If the call encounters any ISDN/GSM call forwarding then the AS 19 will notify this to the Media storage platform 20.

Figure 6:
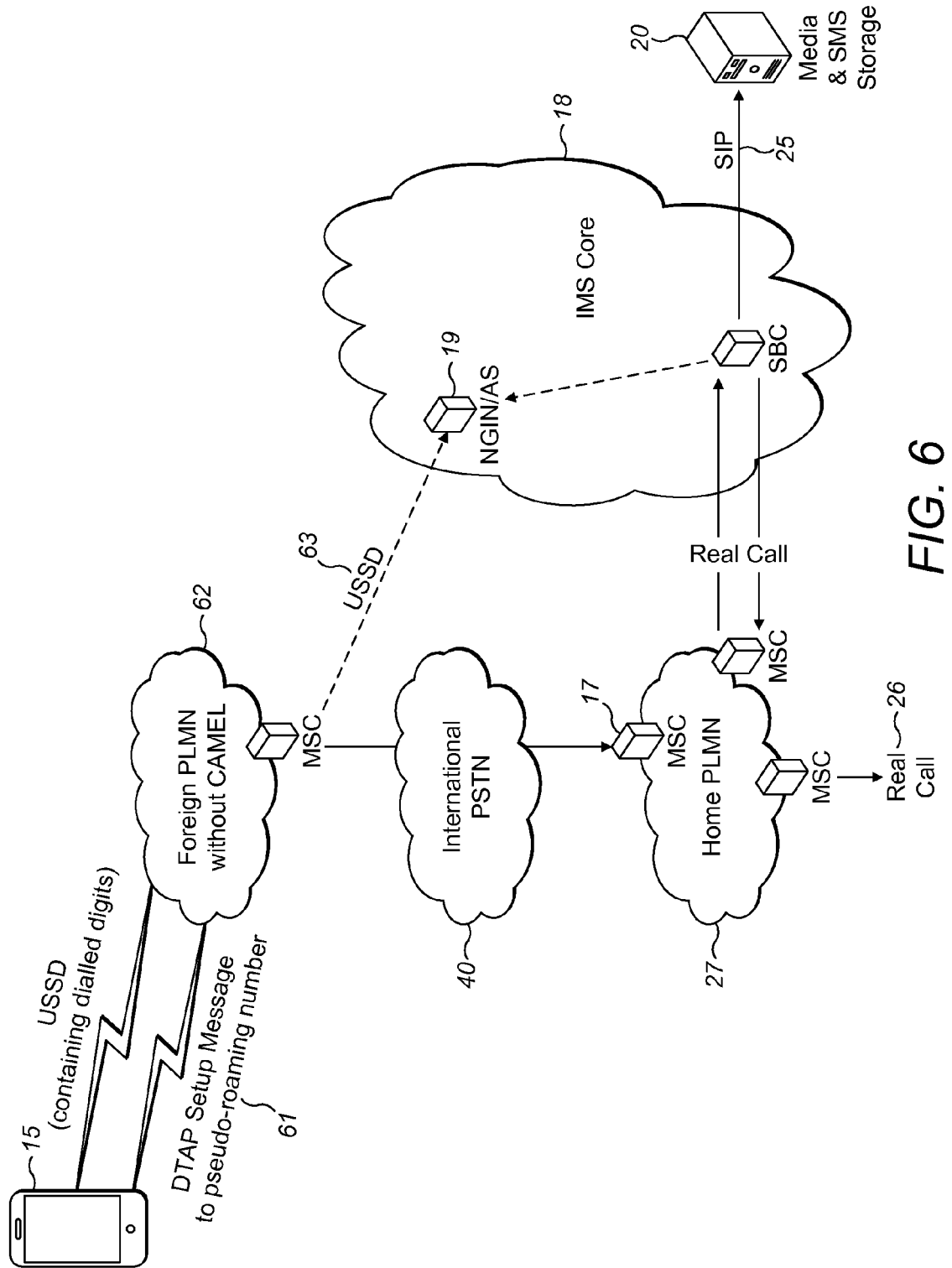
FIG. 6 shows a further embodiment of the present invention for Mobile Originated recording in a foreign PLMN.

A more detailed alternative exemplary implementation will now be described. This embodiment is not reliant on IP data coverage and is illustrated in FIG. 6. First, the client will analyse the dialled digits to determine whether an emergency telephone number, for example, 999, 112, 911 etc. has been dialled. If an emergency telephone number has been dialled, the client will not modify the dialled digits or participate further in the call setup but will allow the call to proceed unhindered. If an emergency telephone number has not been dialled, the client will determine what network the mobile subscriber is currently registered on.

If the client determines that the mobile is roaming on a foreign PLMN 62 that does not support CAMEL then the client will determine whether to (a) prevent the call from proceeding or (b) allow the call to proceed without further participating in the call setup or (c) invoke the call logic for a "Mobile originated call on a foreign PLMN which does not support CAMEL" based on a customer determined setting. If the client is configured to invoke the call logic for a "Mobile originated call on a foreign PLMN which does not support CAMEL" then: The client will send a USSD message, via the HLR (not shown), to the NGIN/Application Server 19. The USSD message sent by the client will comprise the user dialled destination digits (including the "+" symbol if dialled) and the identity of the visited PLMN 62 (the user's E164 msisdn and possibly the VLR address will be conveyed to the NGIN/Application server 19 within the USSD envelope).

Upon receipt of the USSD Message 63, the NGIN/AS 19 will store: the originating mobile subscriber's identity, user dialled digits and the Visited PLMN identity. Note that the NGIN/AS will not be storing the user's CLIR setting.

The NGIN/Application Server 19 will return, in the USSD response 63, the E164 telephone number (known as a pseudo-roaming number) for the client to use in order that the circuit switched telephony call can reach the Application Server 19 and the version number of the current "CAMEL compliant PLMNs list".

Upon receipt of the USSD response from the NGIN/AS 19, the client will initiate the call to the pseudo-roaming number into the mobile phone 15.

A SIM toolkit application shall verify that the IMEI corresponds to the user's registered handset (which has the client installed). If the IMEI is not verified, the call attempt will not be allowed. Otherwise the DTAP SETUP message 61 is allowed to be sent to the VMSC.

The VMSC shall route the call using the Pseudo-Routing Number to the IMS 18.

The NGIN/AS 19 will receive the SIP INVITE and, using the correlationID value within the REQUEST-URI, be able to determine the call originator and the original dialled digits and the VLR address. If the PRIV Header=id, then the user's CLIR setting=restricted. It is noted that CLI presentation is dependant upon it's conveyance across the international PSTN.

The NGIN/AS shall perform number normalisation as follows:

| Original Dialled Number (as received in the USSD) | Example | Normalisation function |
|---|---|---|
| E164 formatted number commencing with a valid country code and prefixed with the "+" sign). | +441635677899 | Remove "+" sign from Original Dialled Number. |
| International dialling, using the appropriate International Dialling Access Code applicable to the Country/VPLMN. Note: The NGIN/AS is required to determine the appropriate International Dialling Access Code(s) eg "00" (as used within most of Europe) or "011" (as used within North America) of "810" (as used in Russia) or "0011" (as used in Australia) etc. for the country/VPLMN being roamed in | 00441635677899 | The IDAC prefix shall be removed from the Dialled Number to generate the E164 number e.g. '441635677899' |
| Local national dialling to a local national telephone number, using the National Dialling Access code applicable to the country/VPLMN Note: The NGIN/AS is required to determine the appropriate National Dialling Access Code eg "0 for the country/VPLMN being roamed in. | 037662222 | NDAC prefix is removed from Dialled Number and replaced with the E164 international country code of the roamed country to form the E164 number e.g. '97237662222' |
| Network short code | 121 | Normalisation or translation not necessary. |

The VPLMN-generated TAP-in CDR will be priced by a retail billing system (based on the roamed network and the +44 pseudo-routing number) and passed to Central Billing via the CSA feed. This CDR will not be used for subscriber billing though it will be used invoice the service provider.

The NGIN shall generate the Mobile Originated CDR that will be used to charge the originating mobile subscriber through the a Central Billing System.

The following error conditions may occur:

It is possible that the client was (at the time when the call was initiated by the user) not aware that, since the last client update, the visited PLMN has recently started to support CAMEL. Consequently, the client will invoke the USSD function to initiate the call and then visited PLMN will invoke CAMEL procedures to control the call. This arrangement will result in a failed call attempt. However, the USSD function will inform the client that a newer version of the CAMEL list exists and this will result in the client initiating a download of the latest version of the CAMEL list in time for the user to re-attempt the telephone call.

It is possible that the client was (at the time when the call was initiated by the user) not to be aware that since the last client update, the visited PLMN no longer supports CAMEL. Consequently, the client will not attempt to invoke the USSD function to initiate the call (believing that the visited PLMN will invoke the CAMEL procedure). This scenario will result in the call not being recorded. To avoid such scenario, Operator will sent out an SMS to notify each Client to request a new CAMEL PLMN list immediately when the client next roams on a foreign PLMN.

The USSD response may also not have been successfully received. In this scenario, the client will be configured to either abandon the call attempt or proceed with the call attempt using the user dialled digits. If the call is allowed to proceed using the user dialled digits, the TAP-in CDR will be rated within VF UK Gemini and passed to the VF Group central Billing system via the CSA feed where it will be re-rated (because the B-number $ pseudo-routing number) and used for bill presentment The call flow of the above detailed exemplary implementation can be summarised as follows. First, the mobile user dials telephone number "01635677899". The client determines the mobile is roaming on a PLMN that does not support CAMEL so that USSD intervention is required. The client instructs the mobile to send a USSD command comprising the user dialled digits to the HLR (not shown). The HLR then forwards the USSD to the NGIN/AS 19. The NGIN/AS 19 returns a PRN (and CAMEL list version) to the client. The client instructs the mobile to establish a call using the pseudo-roaming number. The VMSC sends the call to the NGIN via the home network. The NGIN reconstitutes the call using correlationID in PRN and normalises the dialled digits. The AS 19 instructs the IMS 18 to initiate a conference call to the customer's Call Recording Platform for the MO call. The AS 19 instructs the IMS 18 to initiate a real call to "+861635677899". It is noted that if the call encounters any ISDN/GSM call forwarding then the AS 19 will notify this to the customer's Call Recording platform 20. Upon answer, the Call Recording platform 20 will provide the "intrusion warning tone" to the Called Party only (stereo delivery) or both Called Party and Calling Party (mono delivery).

Figure 7:
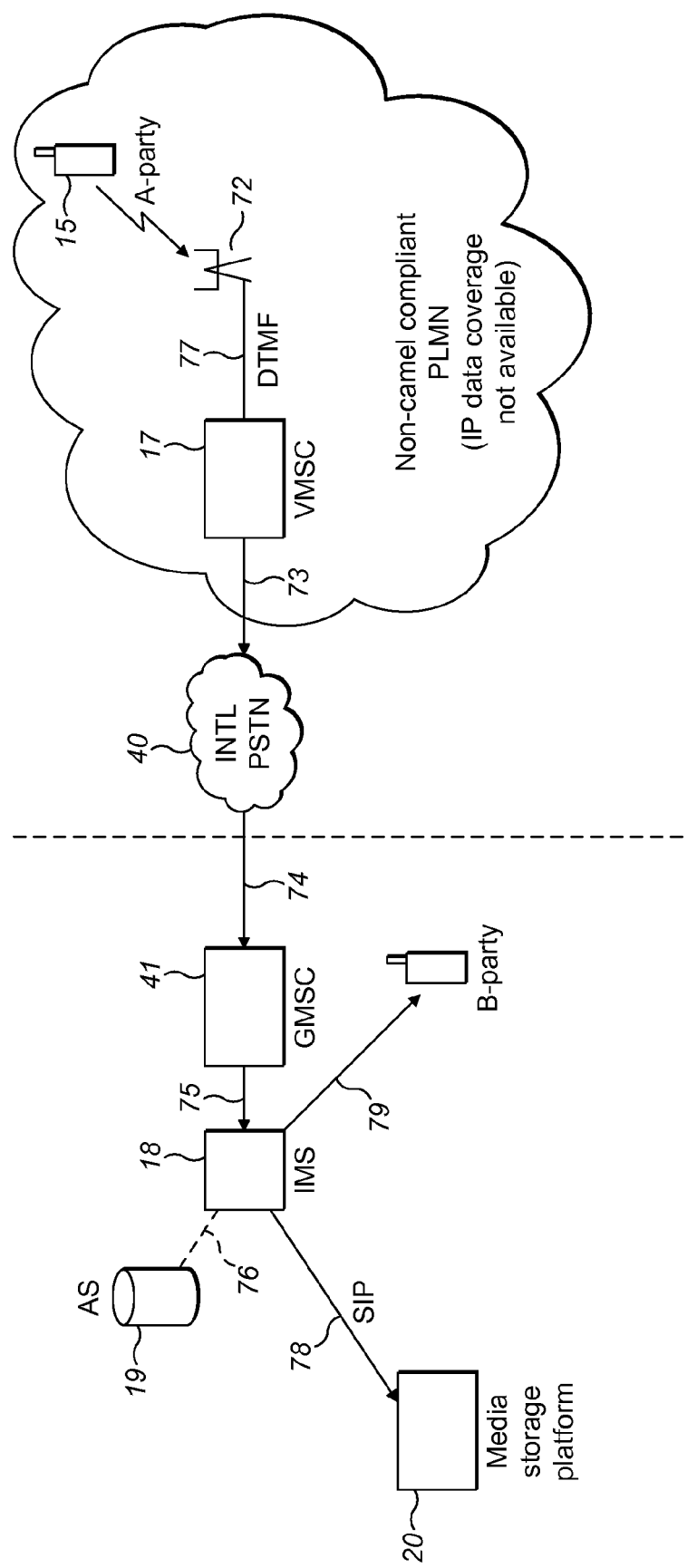
FIG. 7 shows a further embodiment of the present invention for Mobile Originated recording in a foreign PLMN.

In alternative embodiment to that illustrated in FIG. 5, FIG. 7 illustrates call recording for MO calls on CAMEL compliant PLMNs were IP data coverage is not available. First, the mobile user dials the telephone number of B 16 ("01635677899"). The client determines that intervention is required. Where an IP data session can not be established, the mobile sends the default pseudo-roaming number to the VMSC (step 72). The VMSC 17 sends the call to the international PSTN 40 (step 73). The International PSTN carrier sends the call to the home GMSC 41 (step 74). The GMSC 41 sends the call to the IMS 18 (step 75). The IMS 18 refers the call to the AS 19 (step 76). The AS 19 then answers the first call leg. The client sends DTMF digits "01635677899" to the AS which will perform caller authentication (step 77). The AS 19 then instructs the IMS 18 to initiate a conference call to the Media Storage Platform 20 (step 78). Finally, the AS 19 instructs the IMS 18 to initiate the real call to B ("01635677899", step 79). If the call encounters any ISDN/GSM call forwarding then the AS 19 will notify this to the Media storage platform 20.

Mobile Terminated Call (on Home Network or Roaming).

Figure 8:
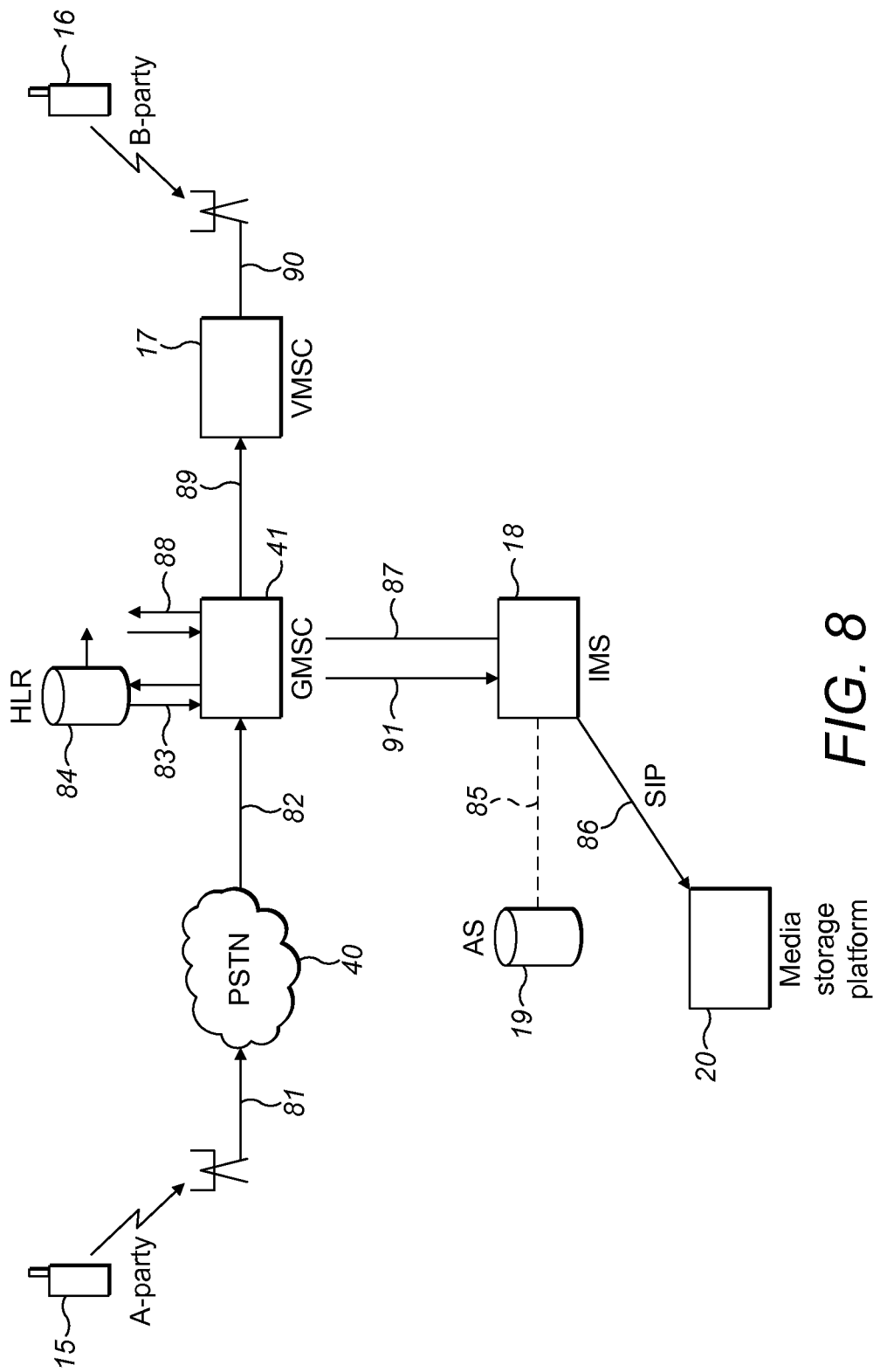
FIG. 8 shows a further embodiment of the present invention for Mobile Terminated recording.

FIG. 8 illustrates an embodiment of the invention for recording Mobile Terminated calls. First, the PSTN subscriber dials mobile telephone number 07748328754 belonging to recorded mobile user (step 81). The PSTN sends the call to Operator GMSC 41 (step 82). The GMSC 41 attempts to get location details of the wanted mobile from the HLR 84 but instead the HLR 84 returns a TICK service trigger (step 83). The GMSC 41 then sends the call to IMS 18 (step 91). The IMS 18 refers the call to the AS 19 (step 85). The AS 19 instructs the IMS 18 to initiate a conference call to the Media Storage Platform 20 (step 86). The media storage platform 20 will return the pre-connection announcement to the caller. The AS 19 instructs the IMS 18 to initiate a real call to "07748328754" (step 87). The GMSC 41 suppresses TICK to get the location details of wanted mobile from the HLR (step 88). The GMSC 41 then sends the call to the VMSC 17 (step 89). The VMSC 17 alerts the wanted mobile 16 (step 90).

Figure 9:
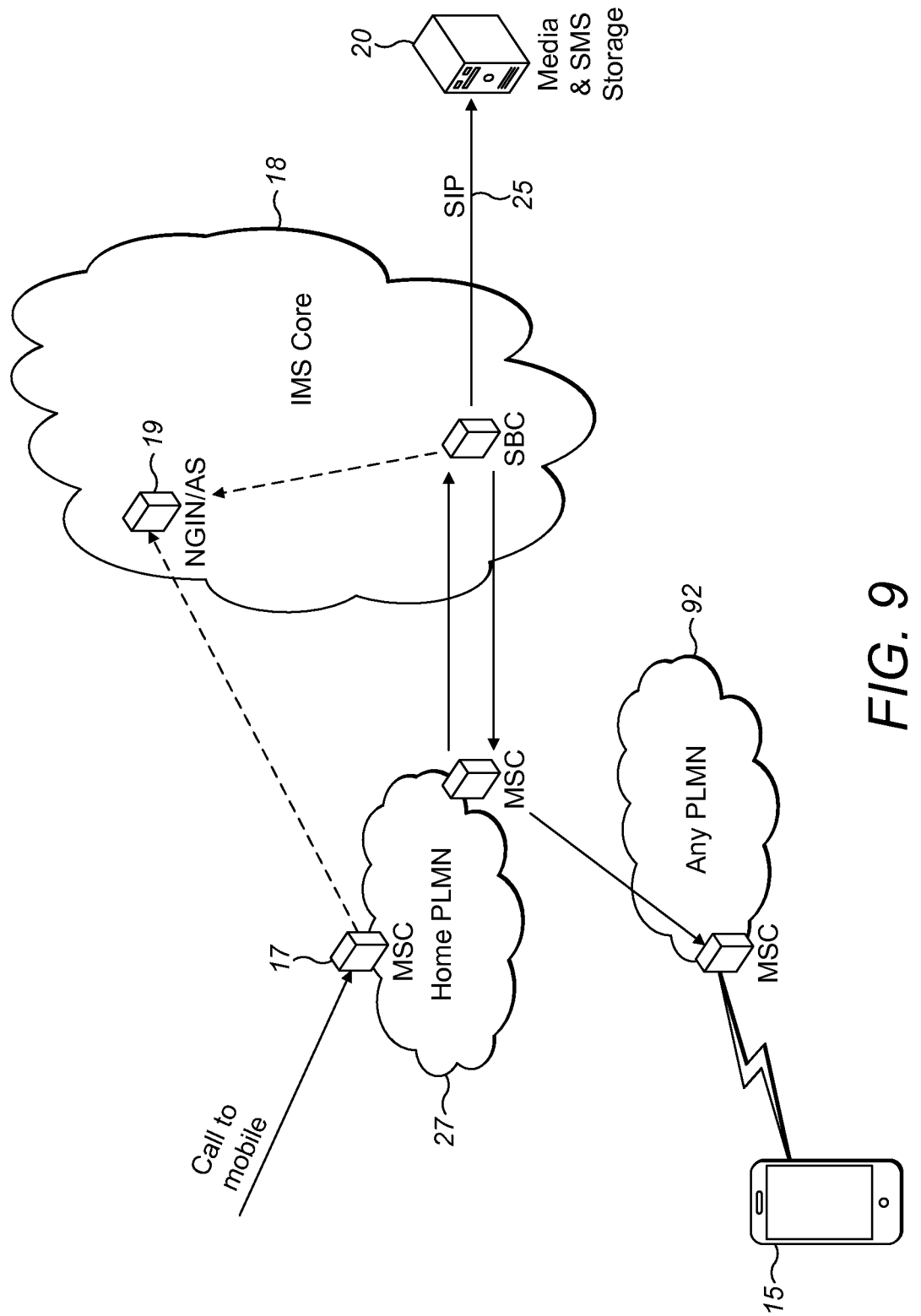
FIG. 9 shows a further embodiment of the present invention for Mobile Terminated recording.

A further, detailed, exemplary implementation of mobile terminated call recording will now be described. This embodiment is illustrated in FIG. 9. On reaching the first Operator gateway MSC 17, an HLR enquiry will be performed which will identify that the called user has terminating service logic which must be performed by the home NGIN/AS 19.

The NGIN/AS 19 will receive the INAP/CAMEL IDP for the terminating service and shall return a Pseudo-routing Number (comprising <HomeCountryCode> <OperatorID> <msisdn>) within the INAP/CAMEL CONNECT message.

In the event that a CAMEL signalling error occurs, the call attempt shall not be allowed to proceed ie the mobile subscriber's INAP/CAMEL T-CSI parameter "default_ch" shall be configured with the value "RELEASE".

The Operator gateway MSC shall route the call using the Pseudo-Routing Number to the Operator IMS 18.

The NGIN/AS 19 will receive the SIP INVITE and, using the Pseudo-Routing Number value within the REQUEST-URI, be able to determine the wanted mobile subscriber and using the FROM and PAI-header determine the call originator and their CLIR selection.

The Application Server 19 may send a copy of the call media to the customer's Call Recording platform 20 using SIP signalling. Within the SIP Call-Info Header (with Purpose=info) supplied within the SIP INVITE or in a separate SIP INFO message, the following call related details will be conveyed: "Call Type=MT", "A-Party" {derived by the AS from the incoming From header} and "B-Party" {derived by the AS from the incoming Request-URI}. The answer signal pertaining to the real call will be signalled to the Call Recording platform using the (very delayed) ACK for the 200 Final Response returned by the call and SMS storage platform for the SIP INVITE (or alternatively using a SIP INFO message). If the connection to the Call Recording platform can not be established, the Application Server may reject the call attempt (and an announcement played to the caller) or proceed with the call attempt based on a customer-determined configuration. Similarly, if the SIP connection to the Call Recording platform is ended prematurely, the Application Server may tear-down the real call (after an announcement has been played to both parties) or allow the real call to proceed based on customer-determined configuration. Being a single SIP connection, the forward and backward transmission paths of the "real call" will be merged together as a "mono" media delivery to the Call Recording platform i.e. speech from the A-party and B-party will be merged together.

The Application Server routes the "real call" to the called mobile user in any PLMN 92 via the home PLMN using TICK suppress prefix (being the value "8777").

INVITE: Request-URI=+8777 (being a spare international country code) followed by CalledUser'sMSISDN, P-Asserted_ID=Caller'sE164CLI, PRIVACY=id (if user has chosen to restrict their CLI), FROM=E164 msisdn (else Anonymous@invalid if user has chosen to restrict their CLI)

If the call is to be recorded, customer configuration on the Call Recording platform will determine whether the intrusion warning tone, for example, a double-beep every ten seconds, informing the both the calling party and the called party that their call is being recorded, is to be provided. If the intrusion warning tone is to be provided by the Call Recording platform 20, it will commence immediately upon receipt of the answer indication. It is noted that if the Calling Party is another mobile user belonging to the same customer group, configuration shall determine whether the intrusion warning tone associated with the MT call leg shall be provided.

If the media delivery to the Call Recording Platform is stereo delivery, then the intrusion warning tone should only be returned to the originating party.

The client is always in passive mode for MT calls, so the inbound call is always allowed to alert the mobile.

Where the called mobile user has an active GSM Call Forward diversion that is invoked or where the called mobile user invokes Call Deflection, the GMSC (for the unconditional diversion and for all conditional diversions and Call Deflection whilst roaming) or the VMSC (for all conditional diversions and Call Deflection whilst on the home network) will invoke INAP/CAMEL the OICK triggered SIP INVITE to the Application Server, in order that the Mobile Call Forwarding call may also be recorded (as a separate call)

It is unfortunate that whilst UK ISUP signalling conveys all of the relevant signalling information pertaining to the diversion encounter, the SIP>UK ISUP interworking function is unable to properly convey all of this information back to the SIP-based Application Server. Consequently, this embodiment proposes that the SIP>UK ISUP IWF be modified in a proprietary manner in order to map the contents of the UK ISUP Redirection Number and Call Forwarding Information parameters (returned in the UK ISUP Address Complete Message or the Call Progress Message that is used to convey the Alerting event) into a (backward direction) SIP Diversion Header and pass this back to the Application Server in the "181" Call Forwarding provisional response. Alternatively, the SIP>UK ISUP IWF may use a SIP INFO message to convey the "backward direction" Diversion Header to the AS. Upon receipt of this "backward direction" Diversion Header in the 181 Call Diverting provisional response or in the SIP INFO message, the AS will convey the "backward direction" Diversion Header to the customer's Call Recording platform in a SIP INFO message.

In the event that the MT call encounters a Call Forward condition, the customer's Call Recording platform 20 shall maintain the SIP connection from the AS but shall not record the MT call leg nor provide the intrusion warning tone, as these functions will be performed by the Mobile Call Forward call logic instead This exemplary embodiment has the following advantages compared to the current client based solution: significantly quicker call set up by avoiding the first GSM mobile paging sequence (saves at least 4.5 seconds, and significantly more if the user is roaming); more efficient call routing in the mobile network—the call only goes to the user's visited MSC once; the Call Forward on Busy call charge is avoided by the terminating mobile user; use of IMS AS avoids PSTN interconnect charge incurred by the operator to get the call to the Call Server, use of IMS AS avoids PSTN access charge incurred by customer to get the call to the wanted user; ensures that the user is a subscriber; the user's MT calls will be recorded even if they remove their SIM from their authorised mobile handset and put it in an unauthorised handset; if both Mobile Roaming (and SMS services) are not required, the solution is SIM based ie it can use any handset because the client is not required; because SIP is used by the Application Server (rather than a "tapped ISDN30" line), calls that are to be deposited to the called user's voicemail box do not need to be sent out towards the called user again (this avoids a second Call Forwarding charge being incurred by the called mobile user and avoids the PSTN conveyance charge towards the called mobile user); supports GSM Call Waiting; supports GSM Call Forwarding services eg CFU, CFB, CFNR, CFNRc & CD, to any destination; supports GSM Call Transfer; supports GSM 3-Party calls; supports GSM Conference Calls; and, supports Network voicemail.

The call flow of the above detailed exemplary implementation can be summarised as follows. First, the PSTN subscriber dials mobile telephone number belonging to recorded mobile user. Next, the PSTN sends the call to Operator GMSC. The GMSC attempts to get the location details of the wanted mobile from the HLR but instead the HLR returns a INAP/CAMEL terminating call service trigger. The GMSC sends INAP/CAMEL IDP for the terminating call to NGIN/AS. The NGIN/AS returns CONNECT containing PRN (comprising OpCoIdentity and msisdn). The GMSC sends the call to the IMS. The IMS refers the call to NGIN/AS and uses PRN to identify wanted mobile. The AS instructs the IMS to initiate a "conference call" to the Call Recording Platform for the MT call. The NGIN/AS instructs the IMS to initiate real call to called mobile (with instruction to suppress IN terminating call service trigger). The GMSC suppresses TICK and to get location details of the wanted mobile from the HLR. Finally, upon answer, the Call Recording platform will provide the "intrusion warning tone" to the Calling Party only (in 'stereo delivery' mode) or both Calling Party and Called Party (in 'mono delivery' mode). It is noted that if a GSM call forward condition is encountered, the MT leg need not be recorded as the Mobile Call Forwarded call will be recorded.

Mobile Call Forwarding Call

Figure 10:
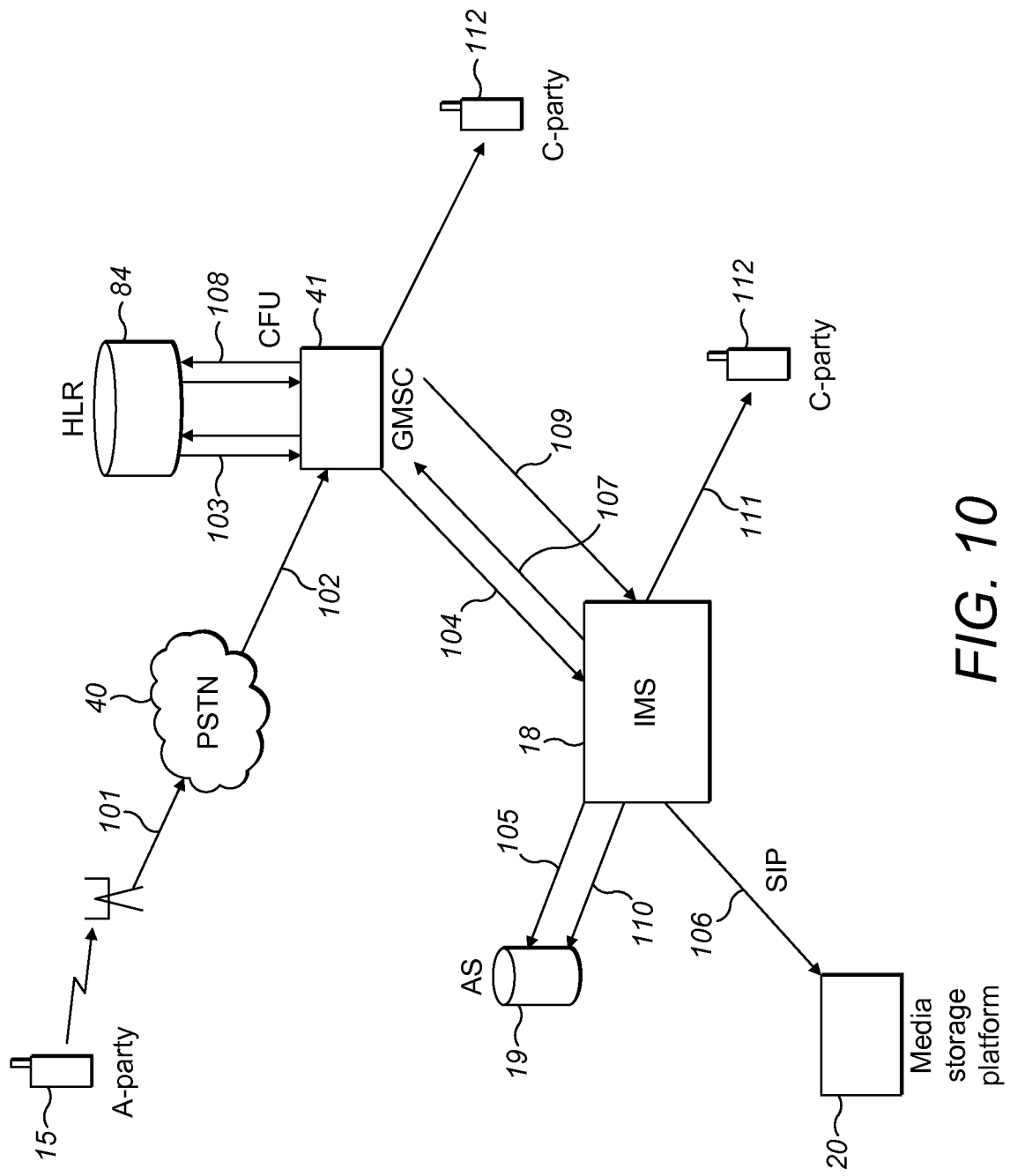
FIG. 10 shows a further embodiment of the present invention for call forward recording.

FIG. 10 illustrates a Mobile Diverted call, that is, an MT call that encounters a GSM Call Forward condition. First, the PSTN subscriber dials mobile telephone number 07748328754 belonging to recorded mobile user (step 101). The PSTN sends the call to Operator GMSC 41 (step 102). The GMSC 41 attempts to get location details of wanted mobile from the HLR but instead the HLR returns a TICK service trigger (step 103). The GMSC 41 sends the call to the IMS 18 (step 104). The IMS 18 refers the call to the AS 19 (step 105). The AS 19 instructs the IMS 18 to initiate a conference call to Media Storage Platform 20 (step 106). The media storage platform 20 will return the pre-connection announcement to the caller. The AS 19 instructs the IMS to initiate real call to "07748328754" (step 107). The GMSC 41 suppresses TICK and gets the location details of the wanted mobile from the HLR 84 (step 108). The HLR 84 returns a Call Forward Unconditional instruction. The GMSC originates a CFU call leg to the IMS 18 (step 109). The IMS 18 then refers the call to the AS 19 (step 110). The AS 19 instructs the IMS 18 to initiate the call to the user nominated Call Forward destination 112 (step 111). The AS 18 will notify the GSM Call Forward encounter to the Media storage platform 20.

This embodiment has the following advantages compared to known client based solutions: the system provides the customer with the option not to record mobile diverting calls; the operator can charge the mobile diverted call directly to the originating user; the operator can differentially charge on-VPN and on-Net mobile diverted calls; the system ensures that the user is still a subscriber; the system respects the mobile subscriber's "international calls" and "premium rate calls" bars; if both Mobile Roaming and SMS services are not required, the solution is SIM based i.e. it can use any handset because the client is not required; the system supports GSM Call Forwarding services eg CFU, CFB, CFNR, CFNRc & CD, to any destination; and, supports Network voicemail.

A further exemplary embodiment will now be described. Where the called mobile user has an active GSM Call Forward diversion that is invoked or where the called mobile user invokes Call Deflection which results in call forward on Busy, the GMSC (for the unconditional diversion and for all conditional diversions and Call Deflection whilst roaming) or the VMSC (for all conditional diversions and Call Deflection whilst on the home network) will invoke the INAP/CAMEL trigger for the Mobile originated Call Forwarding call.

The NGIN/AS will receive the INAP/CAMEL IDP for the Call Forwarding Service and will store the Called Party Number and Calling Party Number parameter (with it's APRI value) against a correlation Identity number and shall return a Pseudo-routing Number (comprising <HomeCountryCode> <NationalNumberGroup> <Correlationidentity>) within the INAP/CAMEL CONNECT message.

In the event that a INAP/CAMEL signalling error occurs, the call attempt shall not be allowed to proceed ie the mobile subscriber's CAMEL O-CSI parameter "default_ch" shall be configured with the value "RELEASE".

The VMSC shall route the call using the Pseudo-Routing Number to the IMS.

The NGIN/AS will receive the SIP INVITE and, using the correlationID value within the REQUEST-URI, be able to determine the call originator (and their CLIR selection), Last Diverting party and the Forwarding number.

The Application Server shall determine that Mobile Call Forwarding call logic shall be applied because the OICK triggered SIP INVITE will include the SIP Diversion Header. The Application Server then looks at the translated/null translated digits to determine if the originating user diverted to an international telephone number or UK premium rate telephone number. If so, the Application Server checks that the originating user has the appropriate calling privileges by performing a "HLR Test Call". The Application Server then determines whether the Called Party is the E164 msisdn of another user belonging to the same customer group. If the Called Party is the E164 msisdn of another user belonging to the same customer group, then on-VPN charging shall apply.

The Application Server shall send a copy of the call media to the customer's Call Recording platform using SIP signalling. Within the SIP Call-Info Header (with Purpose=info) supplied within the SIP INVITE or in a separate SIP INFO message, the following call related details will be conveyed: "Call Type=MCF", "A-Party", "Diverting Party" "C-Party" and "Diversion Type" {derived by the AS from the incoming Diversion Header}". The answer signal pertaining to the real call will be signalled to the Call Recording platform using the (very delayed) ACK for the 200 Final Response returned by the Call Recording platform for the SIP INVITE (or alternatively using a SIP INFO message). If the connection to the Call Recording platform for the MCF Call can not be established, the Application Server may reject the call attempt (and an announcement played to the caller) or proceed with the call attempt based on a customer-determined configuration for the MCF scenario. Similarly, if the SIP connection to the Call Recording platform for the MCF call is ended prematurely, the Application Server may tear-down the real call (after an announcement has been played to both parties) or allow the real call to proceed based on customer-determined configuration for the MCF scenario. Being a single SIP connection, the forward and backward transmission paths of the "real call" will be merged together as a "mono" media delivery to the Call Recording platform i.e. speech from the A-party and B-party will be merged together.

The Call Recording Platform shall return the post connection announcement to both the calling party and the called party.

The Application Server routes outgoing call leg of the "real call" to the intended diversion destination via the home PLMN.

It is noted that it is always possible that the real MCF call will encounter a further call diversion. It is unfortunate that whilst UK ISUP signalling conveys all of the relevant signalling information pertaining to the diversion encounter, the SIP>UK ISUP interworking function is unable to properly convey all of this information back to the SIP-based Application Server. Consequently, this document proposes that the SIP>UK ISUP IWF be modified in a proprietary manner in order to map the contents of the UK ISUP Redirection Number and Call Forwarding Information parameters (returned in the UK ISUP Address Complete Message or the Call Progress Message that is used to convey the Alerting event) into a (backward direction) SIP Diversion Header and pass this back to the Application Server in the "181" Call Forwarding provisional response. Alternatively, the SIP>UK ISUP IWF may use a SIP INFO message to convey the "backward direction" Diversion Header to the AS. Upon receipt of this "backward direction" Diversion Header in the 181 Call Diverting provisional response or in the SIP INFO message, the AS will convey the "backward direction" Diversion Header to the customer's Call Recording platform in a SIP INFO message.

The MSC-generated Mobile Call Forwarded CDR will be priced by a retail billing system and passed to Central Billing via a CSA feed. This CDR will not be used for subscriber billing though it will be used invoice the service provider.

NGIN shall generate the Mobile Call Forwarded CDR that will be used to charge the originating mobile subscriber through the a Central Billing System.

The call flow of the above detailed exemplary implementation can be summarised as follows. The process begins with the same call sequence as for MT calls. However, instead of the GMSC getting the location details of the wanted mobile from the HLR, the GMSC/VMSC will invoke the GSM Call Forward supplementary service which will, in turn trigger the INAP/CAMEL originating call service trigger with call type. The GMSC sends INAP/CAMEL IDP for the call forwarding call to NGIN/AS. The NGIN/AS returns CONNECT containing PRN (comprising OpCoIdentity and msisdn).

The GMSC sends the call to IMS. The IMS the refers the call to the NGIN/AS, and uses the PRN to identify the wanted mobile. The AS then instructs the IMS to initiate a "conference call" to the Call Recording Platform for the MCF call. The NGIN/AS instructs the IMS to initiate real call to called mobile (with instruction to suppress IN terminating call service trigger). The GMSC the suppresses TICK and gets the location details of the wanted mobile from the HLR. On ISUP ACM the fact that the call encountered a Call forward will be returned back from the terminating switch and this will be conveyed back to the NGIN/AS. The NGIN/AS may notify this to the Call Recording platform and may release the conference call-leg for the MT Call recording platform. Upon answer, the Call Recording platform will provide the "post-connection announcement" to both the Calling Party and Called Party. It is noted that if the call encounters any subsequent ISDN/GSM call forwarding then the AS will notify this to the Call Recording platform.

"Intrusion Warning Tone" and the "Post-Connection Announcement"

In order to comply with privacy requirements, it may be necessary for all parties involved in a call that's being recorded to be made aware of this situation. For this reason, this design includes the provision of an "Intrusion warning tone" and, for some call scenarios a "Post-connection announcement".

In the two very simple call scenarios ie the MO call and the MT call, at least one party in the call is knowledgeable as to the significance of the intrusion warning tone, and this party can explain the significance of the intrusion warning tone to the other party, if this becomes necessary. Specifically, for an MO call, intrusion warning tone should, where ever possible, be provided to the B-Party only whilst for a MT call, intrusion warning tone should, wherever possible, be provided to the A-party only.

In the Mobile Call Forward call scenario, it is likely that neither the originating party (A-party) or the destination party (C-party) would be knowledgeable as to the significance of any intrusion warning tone when the call is being recorded because of a diverting mobile user (B-party). Hence the requirement for the "post-connection announcement" to notify both the originating party and destination party that (because of the diverted mobile call) their call is being recorded on behalf of a third-party mobile subscription that is not participating in the call path (but is responsible for the diversion leg of the call). Subsequent, to the "post-connection announcement", no "Intrusion Warning Tone" shall be provided for call.

Language selection of the "post-connection announcement" may be applied based on the preference of the diverting mobile user or being based on the international country code of the caller's CLI.

The call scenario that follows, is extreme but helps to explain the situation: Three mobile users, "User A1", "User B2" and "User C3" each have a mobile which is subject to call recording and are employed by three different companies 1, 2 and 3 respectively. "User A1" calls "User B2" (who has set a Call Forward on No Reply to "User C3"). When "User C3" answers the call, the post-connection announcement will be provided to both "User A1" and "User C3" in relation to the MCF call of "User B2". Intrusion warning tone will be provided to "User A1" in relation to the MT call of "User C3". Intrusion warning tone will be provided to "User C3" in relation to the MO call of "User A1".

It is noted that if only post-connection announcements were deployed for MO, MT and MCF calls, these announcements would interfere with each other in complex call scenarios. Furthermore, The use of pre-connection announcements for MT calls might interfere with other network announcements such as "The mobile that you have called is switched off . . . ".

Mobile Originated and Mobile Terminated SMS Functionality

Figure 11:
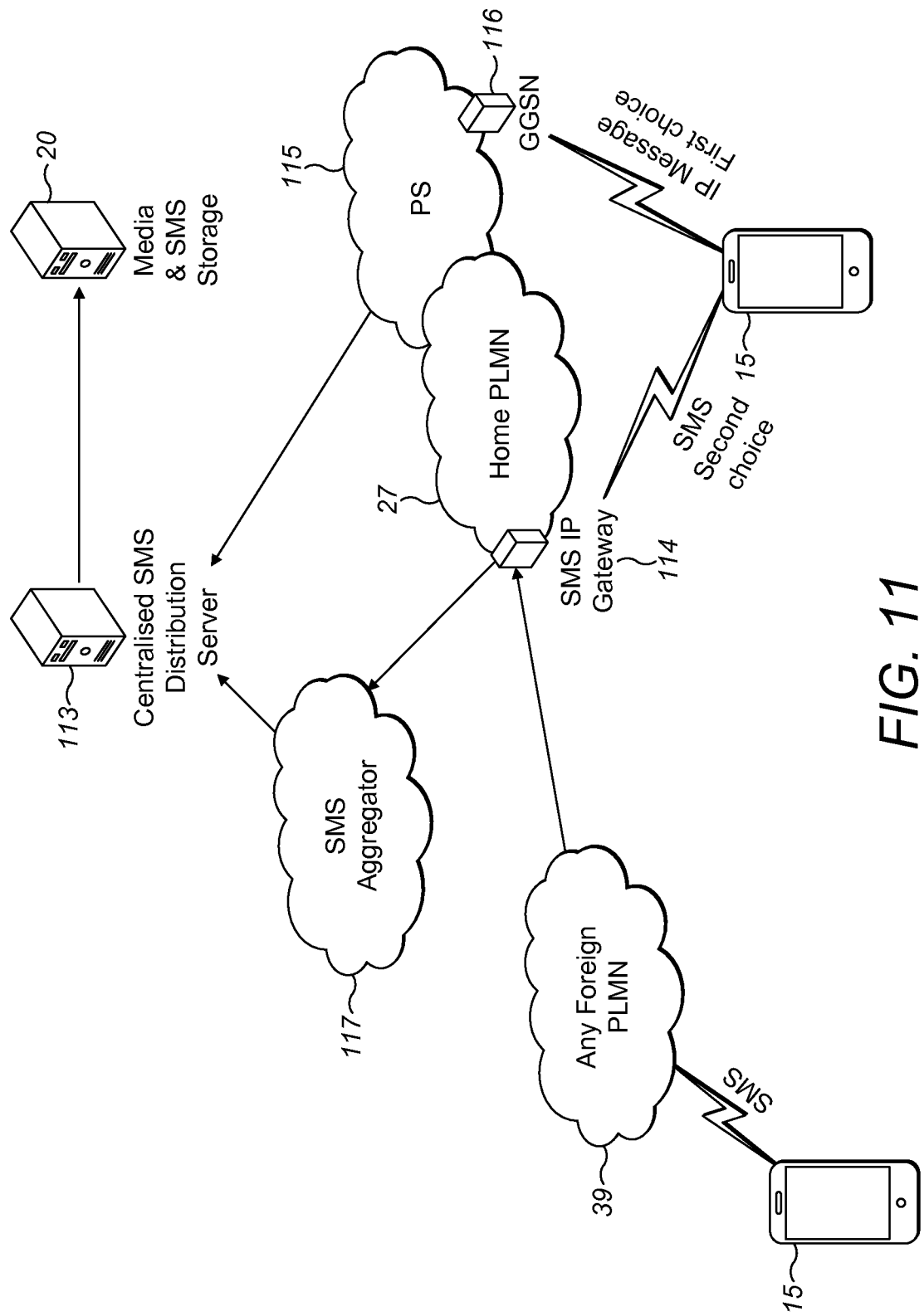
FIG. 11 shows a further embodiment of the present invention for SMS recording.

The exemplary SMS recording is illustrated in FIG. 11 and is proposed as follows: (a) where IP data coverage exists on the home PLMN 27, a copy of the MO or MT SMS is generated by the client on mobile device 15 and sent to the centralised SMS distribution server 113 by an IP Message via the GGSN 116 as part of the packet switched PS network 115. Where IP data coverage is not available or the mobile is roaming on a foreign PLMN 39, the mobile client will create a "close replica" SMS message from the MO or MT SMS and sends it to an SMS aggregator 117 who will send it to a centralised SMS distribution server 113, which will normalise the SMS into an exact replica of the original SMS and send it to the customer's SMS storage system 20. Where data is not available in the home PLMN, an SMS IP gateway 114 may be used to forward the data to the SMS aggregator 117. For bill presentment purposes, the Retail Billing System shall overwrite the SMS aggregator's service number with generic text like "Copied SMS sent to your SMS recording server".

The client will hold a network white-list to prevent SMS messages relating to Voicemail notifications and roaming SMS welcome messages being recorded (and, even worse, at the user's expense).

The SMS recording and storage platform will discard any MO SMS that have been sent to a user declared white-list destination. Similarly, the SMS recording and storage platform will discard any MT SMS that have been sent from a user declared white-list source.

Storage of MO SMS and MT SMS may only be performed if the other party is not on the user's personal white-list i.e. the client may not hold the user's personal white-list.

Voicemail Services

The embodiments described above use network voicemail. In recognition that the user may select SMS as the Message Deposit Notification method, the SMS sender address of the Network Voicemail system may be included in the Client's "SMS sender" generic white-list Although recording of the Voicemail deposit will be performed at the time of the deposit, not means will exist to determine whether the subscriber ever retrieved the message if the Voicemail system allowed the user to retrieve their messages from any telephone device. Consequently, each mailbox must be configured so as to prevent Voicemail access from any telephony device other than the mobile subscriber's mobile phone.

Although Voicemail retrieval will only be allowed from the mobile subscriber's mobile phone, direct message deposits will not enable the identity of the caller to be determined. Consequently each mailbox must be configured so as to prevent direct voicemail deposit.

Because Voicemail outdialling to return calls will not enable to identity of the destination to be determined, each mailbox must be configured so as to prevent outdialling to return calls.

Disaster Over-Ride Arrangements

If the Call Recording platform (or access to it) fails, and this is resulting in the users' telephony calls failing to establish then the Mobile VPN configuration in the AS may be changed (from "Compelled Recording" to "Best Endeavours Recording").

Client Configuration and Updating

Figure 12:
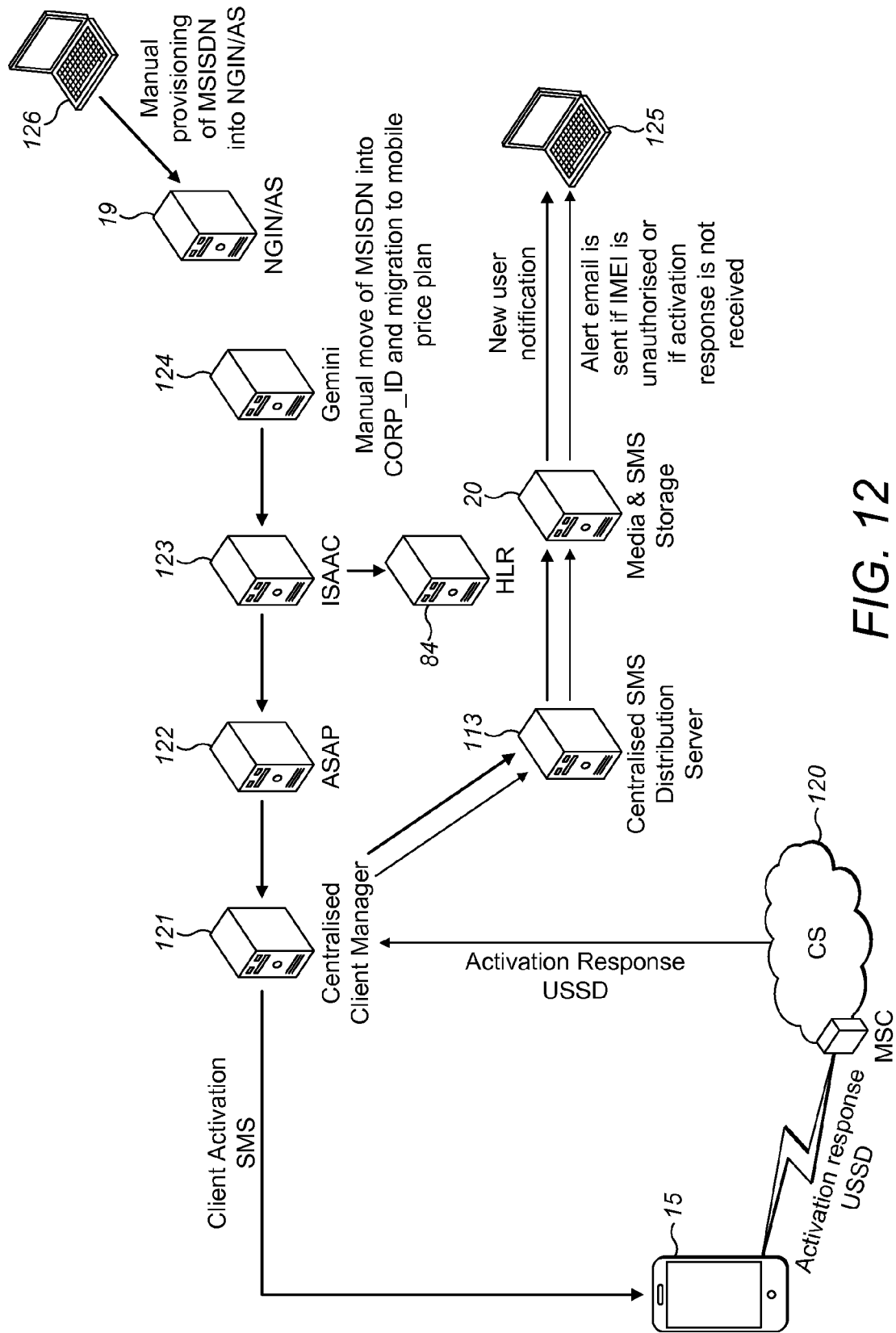
FIG. 12 shows a further embodiment of the present invention for user provisioning.

The client may only accept activations, deactivations and updates (by SMS) from the specified centralised client management server 121 depicted on FIG. 12. The client may pull the most current "CAMEL compliant PLMNs list" from the centralised management server 121 (by IP Messaging) after it has learnt (from the USSD response from the NGIN) that a newer version of the list exists.

In the event that a PLMN that was once declared as "CAMEL compliant" is no longer to be regarded as "CAMEL compliant", an SMS will be required to be sent to all clients, to prompt the client to obtain a new "CAMEL compliant PLMN list" when the client subsequently determines that it is roaming.

Mobile Handset Replacement

Prior to activation of the client, details of the IMEIs pertaining to all of the Smart phone handsets that have been loaded with client software will be declared on the call and SMS Storage platform, by an administrator 125.

Figure 13:
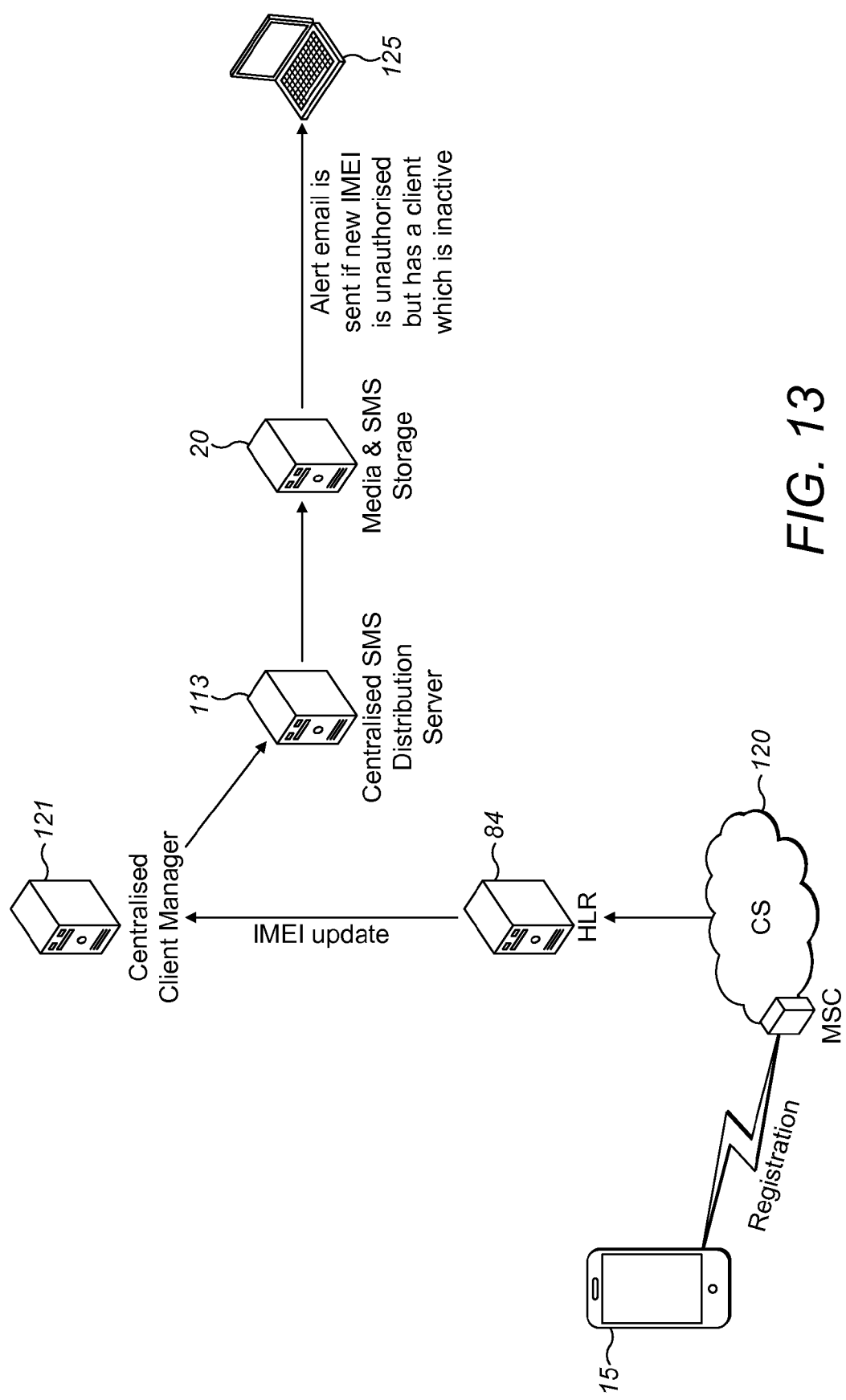
FIG. 13 shows a further embodiment of the present invention for handset change; and, FIG. 14 shows a further embodiment of the present invention for client activation.

Upon client activation, details of the user's IMEI may be stored on the call and SMS Storage Platform (along with the fact that the client is now active). If the IMEI being used by the mobile user's SIM is not one that has already been declared, then the call and SMS Storage Platform will raise an alarm event and may notify the administrator 125 (by email). This is illustrated in FIG. 13 where the mobile device is registered with the circuit switched network 120.

In the event that a user subsequently removes their SIM from their original Smart phone and installs it into another mobile phone, the HLR 84 may notify the Centralised SMS distribution server 113.

The centralised SMS distribution server will then notify the call and SMS Storage Platform. If the new IMEI is one that has previously been declared (and has an active client) then the event will be logged against the user but no notification will be generated, If the new IMEI is one that has previously been declared (but does not currently have an active client) then the call and SMS Storage Platform will send an instruction to the Centralised Client Management server to send a new activation SMS to the mobile user's MSISDN and will raise an alarm event and notify the customer administrator by email (the alarm event will be ended when the client activation attempt is successfully acknowledged by the newly activated client). If the new IMEI is not one which has already been declared, then the customer's call and SMS Storage Platform will raise an alarm event and will notify the customer administrator (by email), i.e. it is permitted for the user to change the Smart Phone that their SIM is inserted into, provided that the new Smart Phone has been declared, i.e. authorised.

User Provisioning

FIG. 12 illustrates how a user may be provisioned in the system. Gemini may provision the CTN using existing provisioning procedures to ISAAC, re-using a new Mobile Tariff Code and using a VPN-name based on the subscriber's CORP_ID. A new feature named "Handset Client" may be applied to the mobile subscription. ISAAC 123 may provision the MSISDN into the HLR 84 using a new HLR profile. ISAAC may provision the MSISDN to ASAP 122 (existing). The new Client feature will be included in the provisioning instruction sent to ASAP 122. ASAP 122 may provision the MSISDN into the NGIN/AS and provision the MSISDN into a new centralised client management server 121.

Figure 14:
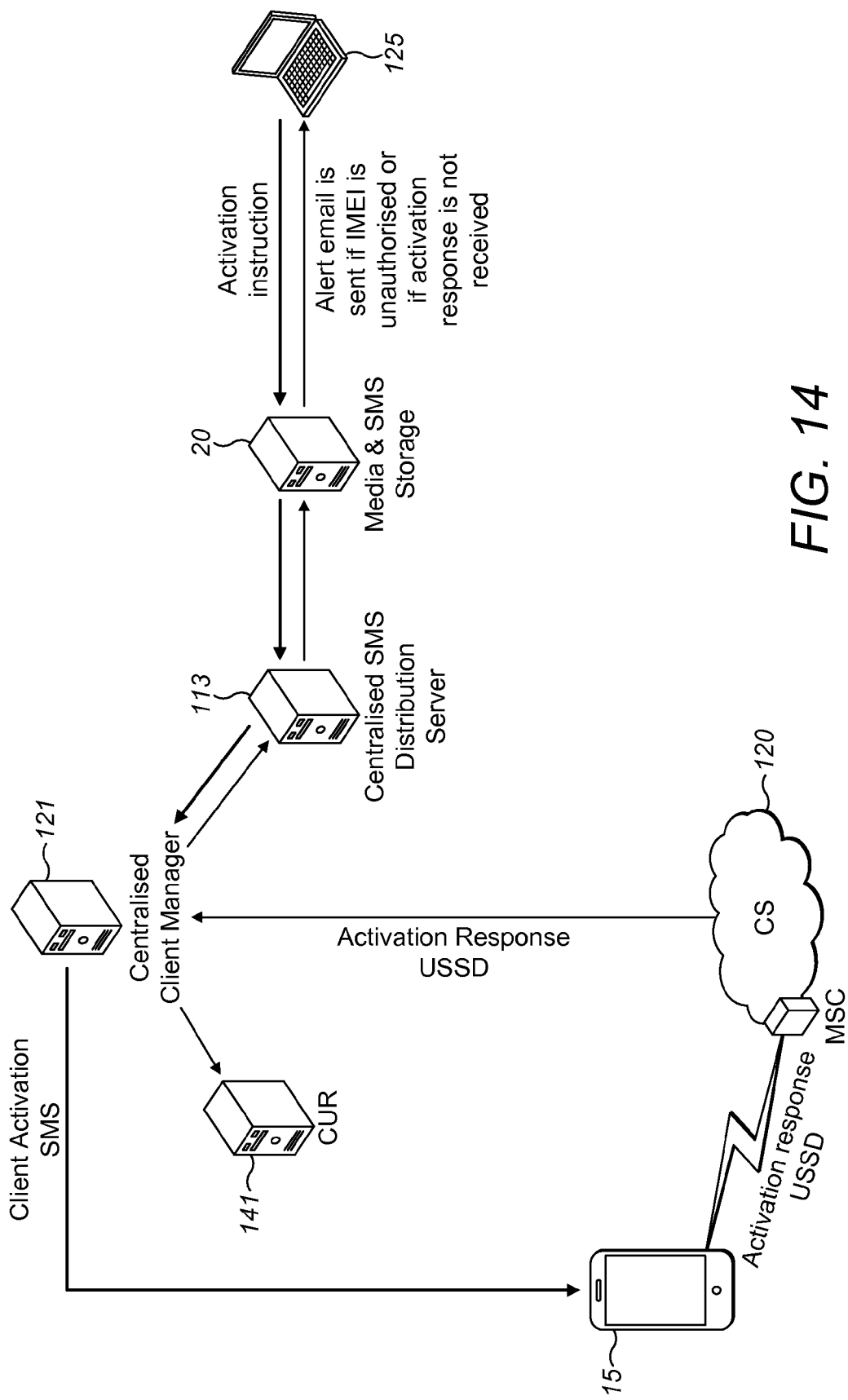

The centralised client management server may provision the MSISDN into the centralised SMS distribution server 113 and may send the client activation SMS message (with the appropriate configuration) to the mobile subscriber to activate the client as illustrated in FIG. 14. It is noted that the centralised client management server 121 may resend the client activation SMS or may send the client deactivation SMS upon receipt of an instruction from the customer's CPE-based/Hosted call and SMS storage system. The centralised SMS distribution server 113 may notify the CPE-based/Hosted call and SMS storage server of the new user. Until the client has acknowledged it's activation, the CPE-based/Hosted call and SMS storage server may regard the user as "partially provisioned". Upon activation, the client will notify the centralised client management server 121 of the handset IMEI. The centralised client management server 121 may update CUR 141 and the centralised SMS distribution server with the client details and IMEI. The centralised SMS distribution server may update the CPE-based/Hosted call and SMS storage server with the IMEI details of the user.

User White-List Numbers

With the exception of a few generic telephone numbers and a few generic SMS senders eg "Network Voicemail Deposit" SMS notifications and "Welcome" SMS notifications sent to roaming subscribers common to all users, the client and the mobile network will handle all MO & MT calls and all MO & MT SMS as if they are to be recorded. However, the call and SMS recording and storage platform can be configured to discard the call media and SMS when the other party is declared to be one of the user's white-listed (personal) contacts.

It may not be possible for a white-list number to be that of another mobile user in the same company group. Any white-list entry that subsequently becomes a mobile user in the same company group shall automatically be deleted as a white-list entry.

Security Issues:

Whilst the IMEI reporting function can identify instances when a mobile user has placed their SIM into a mobile phone that has a different IMEI, the IMEI function may not be unable to identify instances when a mobile user has placed their SIM into a mobile phone that has an IMEI spoofed to be that of the user's authorised mobile phone. Although initially intended to address the specific needs of sections of the banking and finance industry that are covered by the FSA, it is possible that other enterprise customers my take up the product for quality control/order verification purposes. Consequently, credit card information may be recorded and stored on the operator hosted call and SMS storage system.

Whilst not being as independent of user honesty as an entirely network-based solution, the present network-assisted solution is able to generate event reports of SIM/IMEI changes in order to identify instances when the mobile subscriber placed their SIM into an "unauthorised" mobile phone. The solution offers awareness of the IMEI of the mobile handset that the mobile subscriber's SIM is being used with. This capability allows the customer to be notified when a user installs their SIM into an unauthorised mobile handset.

GSM/3G Services not Supported

If the MRF is used to provide the "conference leg" to the call Recording platform, the call content will be recorded in "mono", i.e. the speech of both A-party and B-party is merged together. Consequently, circuit switched data calls and facsimile calls may not be properly recorded. Therefore, mobiles subscribing to the Voice & SMS mobile call recording service must not be provisioned with any Bearer Service associated with CSD or video telephony or any Tele-service associated with facsimile and must not be provisioned with secondary MSISDNs associated with these services.

As a result of the inability of the solution to record MMS, mobiles subscribing to the Voice & SMS mobile call recording service may not be provisioned with the ability to send or receive MMS. Any MMS messages that are sent to the mobile subscriber may be notified to the mobile subscriber by SMS (with an http link to an internet address).

Call Charging

The Mobile Originated CDR or Mobile Call Forward CDR generated by the NGIN/AS may be used to derive the end-user call charge using the VLR to identify the originating PLMN/Country and the E164 telephone number to identify destination (and whether the destination was "on-VPN") and call date/time and duration. The MSC-generated MO CDR (on Home PLMN) and Foreign PLMN-generated TAP CDR (when roaming) shall be used to invoice the service provider. The MSC-generated Roamed Call Forward shall be used to invoice the service provider and shall be used to derive the end-user call charge.

Client

Although the present description describes an example of commissioning a Mobile Client specifically for "call and SMS Recording", instead a known "Rich Communications Suite enhanced" (RCSe) Client could be amended to perform the functions designated for the "Client". This would broaden the choice of handset devices available to the user. It will be understood that other implementations the described client are possible, as long as the implementation provides the described functionality.

The invention claimed is:

1. A telecommunications system for ensuring calls initiated by a mobile device are recordable by a call recording system, the telecommunications system comprising a mobile device and an IP Multi-media Sub-system (IMS), the mobile device being connectable to a Public Land Mobile Network, PLMN, and calls routed through the IMS being referable to the call recording system, wherein:

the mobile device is adapted to:
connect to the PLMN;
determine if the PLMN supports Customised Applications for Mobile network Enhanced Logic, CAMEL; and
upon receiving an attempt from a user of the mobile device to initiate a call to an intended recipient's number:
if the PLMN supports CAMEL, request the PLMN to connect the call such that the PLMN invokes a CAMEL service trigger indicating that the call be routed to the IMS;
otherwise, if the PLMN does not support CAMEL, send to the IMS a data message that includes the intended recipient's number, receive from the IMS a pseudo-roaming number associated with the IMS, and initiate a call to the pseudo-roaming number; and the IMS is adapted to:
if the PLMN supports CAMEL, receive the call routed from the PLMN and connect the call to the intended recipient's number;
otherwise, if the PLMN does not support CAMEL, receive the data message from the mobile device that includes the intended recipient's number, return to the mobile device the pseudo-roaming number associated with the IMS, receive the call initiated by the mobile device to the pseudo-roaming number, and connect the call received from the mobile device to the intended recipient's number so that all calls initiated by the mobile device are routed through the IMS so as to be referable by the IMS to the call storage system for call recording.

2. The telecommunications system according to claim 1, in which the mobile device is further adapted to, upon receiving an attempt from the user of the mobile device to initiate a call to an intended recipient's number, prevent the call from proceeding if the PLMN does not support CAMEL.

3. The telecommunications system according to claim 1, further comprising a Subscriber Identification Module, SIM, for inserting into the device, the SIM adapted to prevent call connection if an International Mobile Equipment Identity, IMEI, of the mobile device does not match an expected IMEI.

4. The telecommunications system according to claim 1, in which, when the mobile device sends an SMS message, the mobile device is further adapted to store the SMS message by:
sending an IP data message corresponding to the sent SMS message to an SMS storage system where the connected PLMN is a home PLMN and where IP data coverage is available, and,
sending a replica of the sent SMS message to the SMS storage system where the mobile device is roaming on a foreign PLMN or where IP data coverage is not available.

5. The telecommunications system according to claim 4, in which, if the destination of the SMS message matches one of a predetermined list of destinations stored on the mobile device, the mobile device does not store the SMS message.

6. The telecommunications system according to claim 1, in which the mobile device is adapted to determine if the PLMN supports CAMEL by evaluating the PLMN against a list of PLMNs that support CAMEL stored on the mobile device.

7. The telecommunications system according to claim 1, in which the IMS is further adapted to send a list of PLMNs that support CAMEL to the mobile device, and wherein the mobile device is adapted to store the list upon receipt of the list from the IMS.

8. The telecommunications system according to claim 1, in which the IMS is further adapted to audibly indicate to one or more parties of the call that the call is being recorded.

9. A telecommunications system for ensuring all calls initiated by a mobile device are recordable, the system comprising a mobile device and an IP Multi-media Sub-system (IMS), the mobile device being connectable to a Public Land Mobile Network, PLMN, for routing a call, wherein:

the mobile device is adapted to:
connect to the PLMN;
determine if the PLMN supports Customised Applications for Mobile network Enhanced Logic, CAMEL; and
upon receiving an attempt from the user of the mobile device to initiate a call to a an intended recipient's number, and in all cases in which the PLMN does not support CAMEL:
prevent the call from being sent directly to the intended recipient's number;
send a data message to the IMS including the intended recipient's number;
receive a pseudo-roaming number from the IMS; and
initiate a call to the pseudo-roaming number; and the IMS is adapted to:
receive the data message including the intended recipient's number from the mobile device;
return to the mobile device the pseudo-roaming number associated with the IMS for the mobile device to use to initiate the call;
receive the call initiated by the mobile device to the pseudo-roaming number;
connect the call received from the mobile device to the intended recipient's number; and
refer the connected call to a call storage system for call recording so that all calls initiated by the mobile device are recordable by the call storage system.

10. The telecommunications system according to claim 9, further comprising a Subscriber Identification Module, SIM, for inserting into the device, the SIM adapted to prevent call connection if an International Mobile Equipment Identity, IMEI, of the mobile device does not match an expected IMEI.

11. The telecommunications system according to claim 9, in which, when the mobile device sends an SMS message, the mobile device is further adapted to store the SMS message by:
sending an IP data message corresponding to the sent SMS message to an SMS storage system where the connected PLMN is a home PLMN and where IP data coverage is available, and, sending a replica of the sent SMS message to the SMS storage system where the mobile device is roaming on a foreign PLMN or where IP data coverage is not available.

12. The telecommunications system according to claim 11, in which, if the destination of the SMS matches one of a predetermined list of destinations stored on the mobile device, the mobile device does not store the SMS.

13. The telecommunications system according to claim 9, in which the mobile device is adapted to determine if the PLMN supports CAMEL by evaluating the PLMN against a list of PLMNs that support CAMEL stored on the mobile device.

14. The telecommunications system according to claim 9, in which the IMS is further adapted to send a list of PLMNs that support CAMEL to the mobile device, and wherein the mobile device is adapted to store the list upon receipt of the list from the IMS.

15. The telecommunications system according to claim 9, in which the IMS is further adapted to audibly indicate to one or more parties of the call that the call is being recorded.

16. The telecommunications system according to claim 9, wherein:
the mobile device is further adapted to:
upon receiving an attempt from the user of the mobile device to initiate a call to a an intended recipient's number, and if the PLMN supports CAMEL, allow the call to proceed to the intended recipient's number without using a pseudo-roaming number, the mobile device requesting the PLMN to connect the call such that the PLMN invokes a CAMEL service trigger indicating that the call be routed to the IMS and the PLMN routes the call to the IMS; and
the IMS is further adapted to:
receive the call routed from the PLMN;
connect the call to the intended recipient's number; and
refer the connected call to a call storage system for call recording so that all calls initiated by the mobile device are recordable by the call storage system.

17. A method performed in a telecommunications system for ensuring all calls initiated by a mobile device are recordable, the telecommunications system comprising a mobile telecommunications device, an IP Multi-media Sub-system (IMS), and a Public Land Mobile Network (PLMN), the method comprising:
receiving, at the mobile telecommunications device, an attempt from a user of the mobile telecommunications device to initiate a call to an intended recipient's number;
establishing a connection between the mobile telecommunications device and the PLMN;
determining, at the mobile telecommunications device, if the PLMN supports
Customised Applications for Mobile network Enhanced Logic, CAMEL;
if the PLMN supports CAMEL,
routing the call, by the PLMN, from the mobile telecommunications device to the IMS by invoking the CAMEL service trigger indicating that the call be routed to the IMS;
connecting the call, by the IMS, to the intended recipient's number;
referring the connected call, by the IMS, to a call storage system; and
recording the call, by the call storage system;
otherwise, if the PLMN does not support CAMEL,
sending to the IMS, by the mobile telecommunications device, a data message that includes the intended recipient's number;
returning to the mobile device, by the IMS, a pseudo-roaming number associated with the IMS;
initiating a call, by the mobile telecommunications device, to the pseudo-roaming number;
receiving, by the IMS, the call initiated by the mobile device to the pseudo-roaming number;
connecting to the intended recipient's number, by the IMS, the call received from the mobile device;
referring the connected call, by the IMS, to a call storage system; and
recording the call, by the call storage system.

18. The method according to claim 17, wherein the PLMN invokes the CAMEL service trigger in response to a request to do so from the mobile telecommunications device.

19. The method according to claim 17, wherein the mobile telecommunications device determines if the PLMN supports CAMEL by evaluating the PLMN against a list of PLMNs stored on the mobile device and that support CAMEL.

20. The method according to claim 17, further comprising sending to the mobile telecommunications device, by the IMS, a list of PLMNs that support CAMEL.

21. A telecommunications system comprising:
an IP Multi-media Sub-system (IMS);
a call storage system configured to record calls referred to the call storage system by the IMS;
a Public Land Mobile Network (PLMN); and
a mobile device connectable to the PLMN, the telecommunications system being configured to ensure that all calls initiated by the mobile device are routed through the IMS so as to be recordable by the call storage system;
wherein:
the mobile device is adapted to:
receive an attempt from a user of the mobile telecommunications device to initiate a call to an intended recipient's number;
establish a connection with the PLMN;
determine if the PLMN supports Customised Applications for Mobile network Enhanced Logic (CAMEL); and
if the PLMN supports CAMEL, request the PLMN to connect the call using the intended recipient's number such that the PLMN invokes a CAMEL service trigger indicating that the call be routed to the IMS;
otherwise, if the PLMN does not support CAMEL, prevent the call from being sent directly to the intended recipient's number, send to the IMS a data message that includes the intended recipient's number, receive from the IMS a pseudo-roaming number associated with the IMS, and initiate a call to the pseudo-roaming number;
the PLMN is adapted to invoke a CAMEL service trigger to route the call to the IMS if the PLMN supports CAMEL; and
the IMS is adapted to:
if the PLMN supports CAMEL, receive the call routed from the PLMN, connect the call to the intended recipient's number, and refer the connected call to the call storage system for call recording;
otherwise, if the PLMN does not support CAMEL, receive the data message from the mobile device that includes the intended recipient's number, return to the mobile device the pseudo-roaming number associated with the IMS, receive the call initiated by the mobile device to the pseudo-roaming number, connect the call received from the mobile device to the intended recipient's number, and refer the connected call to the call storage system for call recording.

22. The telecommunications system according to claim 21, wherein the mobile telecommunications device is adapted to determine if the PLMN supports CAMEL by evaluating the PLMN against a list of PLMNs stored on the mobile device and that support CAMEL.

23. The telecommunications system according to claim 21, wherein the IMS is further adapted to send to the mobile telecommunications device a list of PLMNs that support CAMEL.

\* \* \* \* \*